United States Patent
Mijar et al.

(10) Patent No.: US 9,622,068 B2
(45) Date of Patent: *Apr. 11, 2017

(54) SYSTEM, METHOD AND COMPUTER PROGRAM PRODUCT FOR CONNECTING ROAMING MOBILE DEVICES TO A VIRTUAL DEVICE PLATFORM

(71) Applicant: Hypori, Inc., Austin, TX (US)

(72) Inventors: Sanjay Mijar, Austin, TX (US); Phani Achanta, Austin, TX (US); Brian J. Vetter, Austin, TX (US); Justin P. Marston, Austin, TX (US)

(73) Assignee: Hypori, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,783

(22) Filed: Jun. 14, 2016

(65) Prior Publication Data
US 2016/0295394 A1 Oct. 6, 2016

Related U.S. Application Data

(63) Continuation of application No. 14/160,904, filed on Jan. 22, 2014, now Pat. No. 9,380,523.
(Continued)

(51) Int. Cl.
*H04W 4/00* (2009.01)
*H04W 8/06* (2009.01)
(Continued)

(52) U.S. Cl.
CPC ............ *H04W 8/065* (2013.01); *H04W 8/12* (2013.01); *H04W 48/18* (2013.01); *H04W 64/003* (2013.01); *H04W 84/00* (2013.01)

(58) Field of Classification Search
CPC ...... H04W 8/183; H04W 64/00; H04W 8/245; H04M 1/72519
(Continued)

(56) References Cited

U.S. PATENT DOCUMENTS 6,845,238 B1 1/2005 Muller
7,190,356 B2 3/2007 Lin
(Continued)

OTHER PUBLICATIONS

Office Action for U.S. Appl. No. 14/161,083, mailed Jul. 8, 2016, 31 pgs.
(Continued)

*Primary Examiner* — Danh Le
(74) *Attorney, Agent, or Firm* — Sprinkle IP Law Group

(57) ABSTRACT

Systems, methods and computer program products that enable efficient roaming of virtual mobile devices. In one embodiment, multiple PoP locations having a set of common master images are maintained. A communication from a mobile device received at a central facility identifies a user, a location and a type of the mobile device. The central facility determines performance measures for the PoP locations and identifies a preferred PoP location in response to the communication. If the preferred PoP location has available capacity, the central facility directs the preferred PoP location to provision resources and instantiate a virtual device from a selected master image corresponding to the mobile device. If the preferred PoP location persistently stores a user data volume for the user, the virtual device is attached to the stored user data volume. Otherwise, data is transferred from the user's data volume to a cache attached to the virtual device.

20 Claims, 18 Drawing Sheets

Related U.S. Application Data

(60) Provisional application No. 61/755,205, filed on Jan. 22, 2013.

(51) Int. Cl.
| | |
|---|---|
| *H04W 48/18* | (2009.01) |
| *H04W 8/12* | (2009.01) |
| *H04W 64/00* | (2009.01) |
| *H04W 84/00* | (2009.01) |

(58) Field of Classification Search
USPC ............... 455/432.1, 456.5, 518, 550.1, 418
See application file for complete search history.

(56) References Cited

U.S. PATENT DOCUMENTS

| | | | |
|---|---|---|---|
| 7,400,328 B1 | 7/2008 | Ye et al. | |
| 7,768,959 B1 | 8/2010 | Chen | |
| 7,809,667 B1 | 10/2010 | Yehuda et al. | |
| 7,827,228 B2 | 11/2010 | Emberton | |
| 8,699,379 B2* | 4/2014 | Kholaif | H04W 48/20 370/254 |
| 9,060,239 B1 | 6/2015 | Sinha et al. | |
| 9,143,886 B1* | 9/2015 | Abou-El-Ella | H04W 4/001 |
| 9,179,007 B1* | 11/2015 | Yadav | H04M 15/66 |
| 9,245,241 B2 | 1/2016 | Kite | |
| 9,380,456 B1 | 6/2016 | Lee et al. | |
| 9,380,523 B1 | 6/2016 | Mijar et al. | |
| 9,380,562 B1 | 6/2016 | Vetter et al. | |
| 2003/0182383 A1 | 9/2003 | He | |
| 2005/0088992 A1 | 4/2005 | Bolin | |
| 2006/0203916 A1 | 9/2006 | Chandramouly et al. | |
| 2006/0288306 A1 | 12/2006 | Mahajan et al. | |
| 2007/0086382 A1* | 4/2007 | Narayanan | H04L 63/08 370/331 |
| 2007/0117561 A1 | 5/2007 | Shu | |
| 2008/0225010 A1 | 9/2008 | Wang | |
| 2009/0023426 A1 | 1/2009 | Shatzkamer | |
| 2009/0077475 A1 | 3/2009 | Koster | |
| 2009/0131080 A1* | 5/2009 | Nadler | G06Q 30/02 455/456.3 |
| 2009/0170472 A1 | 7/2009 | Chapin | |
| 2009/0207140 A1 | 8/2009 | Hansson | |
| 2009/0264094 A1* | 10/2009 | Smith | G08B 25/016 455/404.2 |
| 2009/0296689 A1* | 12/2009 | Bakker | H04W 4/22 370/352 |
| 2010/0069035 A1 | 3/2010 | Johnson | |
| 2010/0100725 A1 | 4/2010 | Ozzie | |
| 2010/0103837 A1 | 4/2010 | Jungck | |
| 2010/0115020 A1 | 5/2010 | Hochmuth et al. | |
| 2010/0167714 A1* | 7/2010 | Howarter | H04W 8/24 455/418 |
| 2010/0173605 A1 | 7/2010 | Moraes | |
| 2010/0189887 A1 | 7/2010 | Nielsen | |
| 2010/0238837 A1 | 9/2010 | Zheng | |
| 2010/0306249 A1 | 12/2010 | Hill | |
| 2010/0306771 A1 | 12/2010 | Kamay et al. | |
| 2011/0102299 A1 | 5/2011 | Hochmuth et al. | |
| 2011/0130951 A1 | 6/2011 | Lee | |
| 2011/0176528 A1 | 7/2011 | Lu | |
| 2011/0210972 A1 | 9/2011 | Tsirkin et al. | |
| 2011/0213828 A1 | 9/2011 | Tsirkin et al. | |
| 2011/0223918 A1 | 9/2011 | Dahlen | |
| 2011/0270600 A1 | 11/2011 | Bose | |
| 2011/0271200 A1 | 11/2011 | Kikkawa et al. | |
| 2012/0030022 A1* | 2/2012 | Ajima | G06Q 30/0255 705/14.53 |
| 2012/0064908 A1 | 3/2012 | Fox et al. | |
| 2012/0066304 A1 | 3/2012 | Marmon et al. | |
| 2012/0093145 A1* | 4/2012 | Anchan | H04W 28/24 370/352 |
| 2012/0130042 A1 | 5/2012 | Brunelle et al. | |
| 2012/0182970 A1 | 7/2012 | Ding | |
| 2012/0191657 A1 | 7/2012 | Weinstein et al. | |
| 2012/0296963 A1 | 11/2012 | Lu | |
| 2012/0310894 A1 | 12/2012 | Freedman et al. | |
| 2012/0323690 A1 | 12/2012 | Michael | |
| 2013/0024778 A1 | 1/2013 | Reeves et al. | |
| 2013/0031482 A1 | 1/2013 | Saul | |
| 2013/0078994 A1 | 3/2013 | Jouin | |
| 2013/0083960 A1 | 4/2013 | Kostrzewski et al. | |
| 2013/0086202 A1 | 4/2013 | Connelly | |
| 2013/0173556 A1 | 7/2013 | Grigg et al. | |
| 2013/0188608 A1 | 7/2013 | Balachandran | |
| 2013/0265450 A1 | 10/2013 | Barnes, Jr. | |
| 2013/0275766 A1 | 10/2013 | Plainecassagne et al. | |
| 2013/0283038 A1 | 10/2013 | Kulkarni et al. | |
| 2013/0326072 A1 | 12/2013 | Smyth | |
| 2013/0339185 A1 | 12/2013 | Johnson | |
| 2013/0339498 A1 | 12/2013 | Johnson | |
| 2014/0059160 A1 | 2/2014 | Chernoff | |
| 2014/0071895 A1 | 3/2014 | Bane et al. | |
| 2014/0108084 A1 | 4/2014 | Bargetzi | |
| 2014/0108940 A1 | 4/2014 | Diercks | |
| 2014/0111528 A1 | 4/2014 | Lifshitz et al. | |
| 2014/0358670 A1 | 12/2014 | Lefevre | |
| 2015/0050915 A1 | 2/2015 | Formo | |
| 2015/0082456 A1 | 3/2015 | Eren et al. | |
| 2015/0089395 A1 | 3/2015 | Beel et al. | |
| 2015/0091947 A1 | 4/2015 | Rakow et al. | |
| 2015/0222604 A1 | 8/2015 | Ylonen | |
| 2016/0295551 A1 | 10/2016 | Vetter et al. | |

OTHER PUBLICATIONS

Office Action for U.S. Appl. No. 14/062,343, mailed May 26, 2015, 16 pgs.

Office Action for U.S. Appl. No. 14/160,794, mailed Sep. 1, 2015, 12 pgs.

Office Action for U.S. Appl. No. 14/161,083, mailed Feb. 3, 2016, 27 pgs.

Office Action for U.S. Appl. No. 14/161,157, mailed Feb. 22, 2016, 15 pgs.

Office Action for U.S. Appl. No. 14/160,794, mailed Mar. 9, 2016, 11 pgs.

Office Action for U.S. Appl. No. 14/160,946, mailed Mar. 9, 2016, 20 pgs.

Office Action for U.S. Appl. No. 14/161,157, mailed Aug. 17, 2016, 20 pgs.

Office Action for U.S. Appl. No. 14/160,794, mailed Aug. 22, 2016, 6 pgs.

Office Action for U.S. Appl. No. 14/160,946, mailed Aug. 31, 2016, 28 pgs.

Notice of Allowance for U.S. Appl. No. 14/161,083, mailed Dec. 5, 2016, 6 pgs.

Office Action for U.S. Appl. No. 14/160,946, mailed Jan. 11, 2017, 30 pgs.

Office Action for U.S. Appl. No. 15/181,570, mailed Feb. 1, 2017, 6 pgs.

Notice of Allowance for U.S. Appl. No. 14/161,157, mailed Feb. 3, 2017, 4 pgs.

Notice of Allowance for U.S. Appl. No. 14/160,794, mailed Feb. 17, 2017, 4 pgs.

\* cited by examiner

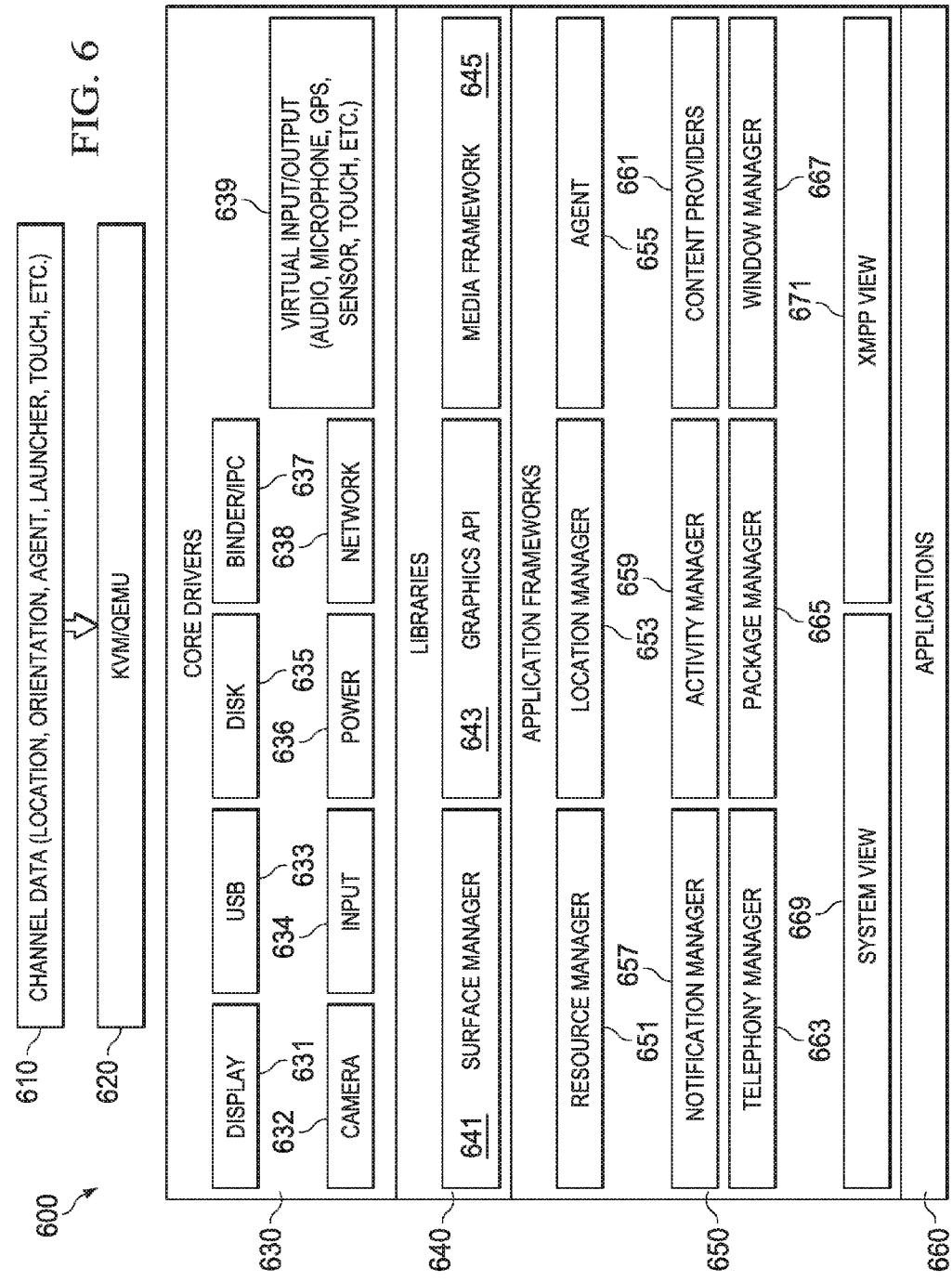

SYSTEM, METHOD AND COMPUTER PROGRAM PRODUCT FOR CONNECTING ROAMING MOBILE DEVICES TO A VIRTUAL DEVICE PLATFORM

CROSS-REFERENCE TO RELATED APPLICATIONS

This application is a continuation of, and claims a benefit of priority under 35 U.S.C. 120 of the filing date of U.S. patent application Ser. No. 14/160,904, filed Feb. 22, 2014, now allowed, entitled "SYSTEM, METHOD AND COMPUTER PROGRAM PRODUCT FOR CONNECTING ROAMING MOBILE DEVICES TO A VIRTUAL DEVICE PLATFORM," which is conversion of, and claims a benefit of priority from U.S. Provisional Application No. 61/755,205, filed Jan. 22, 2013, entitled "VIRTUAL MOBILE DEVICE PLATFORM." This application relates to U.S. patent application Ser. No. 14/160,794, filed Jan. 22, 2014, entitled "SYSTEM, METHOD AND COMPUTER PROGRAM PRODUCT FOR CAPTURING TOUCH EVENTS FOR A VIRTUAL MOBILE DEVICE PLATFORM"; Ser. No. 14/160,877, filed Jan. 22, 2014, entitled "SYSTEM, METHOD AND COMPUTER PROGRAM PRODUCT FOR PROVIDING NOTIFICATIONS FROM A VIRTUAL DEVICE TO A DISCONNECTED PHYSICAL DEVICE"; Ser. No. 14/160,946, filed Jan. 22, 2014, entitled "SYSTEM, METHOD AND COMPUTER PROGRAM PRODUCT PROVIDING BYPASS MECHANISMS FOR A VIRTUAL MOBILE DEVICE PLATFORM"; Ser. No. 14/161,069, filed Jan. 22, 2014, entitled "SYSTEM, METHOD AND COMPUTER PROGRAM PRODUCT FOR DYNAMICALLY SWITCHING OPERATING SYSTEMS IN A VIRTUAL MOBILE DEVICE PLATFORM"; Ser. No. 14/161,083, filed Jan. 22, 2014, entitled "SYSTEM, METHOD AND COMPUTER PROGRAM PRODUCT FOR USER PERFORMANCE AND DEVICE RESOLUTION SETTINGS"; and Ser. No. 14/161,157, filed Jan. 22, 2014, entitled "SYSTEM, METHOD AND COMPUTER PROGRAM PRODUCT FOR GENERATING REMOTE VIEWS IN A VIRTUAL MOBILE DEVICE PLATFORM." All applications listed in this paragraph are incorporated by reference as if set forth herein in their entireties.

TECHNICAL FIELD

This disclosure relates generally to a virtual mobile device platform for touch-enabled mobile devices. More particularly, embodiments disclosed herein relate to a system, method, and computer program product for enabling efficient roaming of mobile devices that are connected to corresponding virtual devices that are hosted on point-of-presence (PoP) servers, where the virtual devices perform functions that are presented to users of the mobile devices as if they were performed on the mobile devices themselves.

BACKGROUND OF THE RELATED ART

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements. One area in need of improvement relates to the performance of the mobile devices when they are used in areas that are remotely located from the particular servers that they normally access. Ideally, a mobile device will connect to a particular server through a network in a manner that minimizes the latency of communications between the mobile device and the server. When the mobile device is closer to the particular server, communications between them generally traverse fewer network interconnects, and the latency in the communications is generally lower. As the geographic distance increases, communications have to traverse more network interconnects, and the latency in the communications increases.

A low communications latency is important in the use of mobile devices that interact with a remote, private server because there is a user expectation that the mobile devices will be as responsive when interacting with the remote server as if they were operating solely based on information stored within the mobile device. This is particularly true when the mobile devices are acting as user interface devices for functions that are performed on the server, but are intended to appear as if they are being performed on the mobile device itself. For instance, if a remote server hosts a virtual device, rendering each action of a user experience and then transferring the corresponding renderings to the user to be displayed on a mobile device, the actions as viewed by the user are delayed by the latency of the communications. As the communications latency between the mobile device and the remote server increases, the mobile device appears to be less responsive, and the user's experience with the device becomes less satisfying. At some point, the latency may become so high that the user experience becomes frustrating, and the user may even consider the mobile device to be unusable.

This issue is especially important in this type of system when a user is roaming in an area that is relatively distant from the server that hosts the virtual device. While network communications may be fast enough that a user may not notice a difference in latency at different points within a city or state, or even a country, latencies are likely to increase substantially when a user travels to a different country or continent. Since this is becoming increasingly common, particularly for business travelers, the effects of latency on the user experience that is presented on the mobile device can be a serious problem. For example, if a person uses the mobile device in the US and the server is in the US, the mobile device may normally connect to the server through the internet or another network with reasonably low latencies. If, however, the user travels to Europe or Asia, connecting to the US-based server may involve unacceptable latencies. Although the US-based server could potentially be replicated in other countries, this would likely be a very inefficient solution to the problem, as many of the replicated resources would be used infrequently.

It would therefore be desirable to provide means to allow users to roam with their mobile devices, yet still have sufficiently low latencies in communications with a private network that the user experience is not degraded.

SUMMARY OF THE DISCLOSURE

Embodiments disclosed herein provide a system, method, and computer program product for enabling efficient roaming of mobile devices that are connected to corresponding virtual devices that are hosted on point-of-presence (PoP) servers, where the virtual devices perform functions that are presented to users of the mobile devices as if they were performed on the mobile devices themselves. A PoP is a set of compute, storage server computers networked in one location. In one embodiment, the mobile devices are used as input/output devices for the virtual devices. The virtual devices are instantiated from master images that include the respective operating systems and any applications that provide the core functionality of the device. After instantiation, the virtual devices are attached to storage volumes that store user-specific data corresponding to the users of the respective devices. A common set of master images is stored on each of a plurality of PoP locations, so that the virtual devices can be instantiated locally at each PoP location. A user is generally assigned a "home point-of-presence (POP)" that is located the closest to him from a latency and geographical perspective. The user data for a particular user is persistently stored on the storage of one of the PoPs (the "Home" PoP for the user). If a virtual device is instantiated for a user on one of the servers in his home PoP, the virtual device is attached to the user's data and accesses the data locally. If the user has roamed to a location far away from the home PoP, and is better served by a PoP closer to his current location and permitted by his enterprise policies, a virtual device is instantiated for a user on a server located in a PoP closer to him, other than the user's home PoP, the virtual device may utilize a cache for accessing the user's data. User data is transferred on an as needed basis from the server on which it is stored to the server on which the virtual device and cache are operating. The cache may be expunged immediately after a user session or maintained for some period of time, depending upon applicable administrative policies. Alternatively, the user data may be migrated in its entirety to the new server, so that it will thereafter be the home server.

In one embodiment, the system includes a master control facility which controls a plurality of PoP location facilities. A PoP location has a plural set of compute, storage servers that are networked to work together. The storage servers within a PoP work together to provide a common storage area/facility for the compute servers. Each of the PoP locations includes a first area of distributed storage. The first distributed storage area stores a common set of master images from which one or more different virtual devices can be instantiated based on user administration enterprise policies. The virtual devices are instantiated and executed on a compute host within the PoP. The PoP includes a second distributed storage area that stores one or more data volumes, where each data volume is associated with a corresponding user. The master control facility is configured to monitor the status and compute capacity of the PoP and receive telemetry such as location and signal strength information from the mobile devices and to determine, based on enterprise policies for the user and location/signal strength and compute capacity, determine for each of the mobile devices, which of the PoP locations is a preferred location for the mobile device. The master control facility directs the preferred servers at the PoP to provision resources for hosting the respective virtual devices. The master control facility may also perform authentication services, telemetry history, location/signal history/analytics services, capacity/ load monitoring services, performance monitoring services, data migration services, master image distribution services, and the like.

An alternative embodiment comprises a method for enabling efficient roaming of mobile devices, where the mobile devices interact with corresponding virtual devices hosted on servers at each point-of-presence (PoP). The method includes maintaining multiple point-of-presence facilities at multiple different physical locations. The method further comprises maintaining, at each of the PoP locations, a set of common master images for one or more virtual devices. The master images may include operating systems and one or more applications for the respective virtual devices. The method further includes receiving, at a master control facility, a communication such as authentication information from a mobile device. The communication can identify, for example, a user of the mobile device, a location of the mobile device, current network signal strength on the device if applicable, a type of the mobile device, etc. The master control facility identifies a set of servers that are available to the user, determines one or more performance measures for each of the PoP locations and, in response to the communication from the mobile device, identifies a preferred PoP location that may best serve the mobile device. If the preferred PoP location has available compute capacity, the master control facility directs the preferred PoP location to provision resources on a compute server and instantiate a virtual device from a selected one of the master images corresponding user of the mobile device. If the preferred PoP location is the "home" PoP location for the user, and persistently stores a user data volume for the user associated with the mobile device, the instantiated virtual device is attached to the stored user data volume. This traversal is local. If the preferred PoP location does not persistently store the user's data volume, a cache is attached to the virtual device, and data is transferred from the "Home" PoP location which stores the user's data volume to the cache, as needed by the user. The virtual device can operate when only a small portion of the data volume has been cached Another embodiment may comprise a computer program product that embodies a method such as is described above. The computer program product comprises a tangible, computer-readable medium that stores instructions which are executable by a computer. When the computer executes the instructions, the computer executes the described method.

Yet another embodiment may comprise a master control facility that is configured to determine the identity and location of a mobile device, determine a preferred PoP location to which the mobile device can be connected, and direct the provisioning of the server and the connection of the mobile device to the server. The master control facility may instruct the PoP location to instantiate an instance of a virtual device from one of a set of common master images stored locally on the Pop location. If a user data volume for the user is stored locally in the PoP facility on distributed storage, the user data volume may be attached to the virtual device. If the user data volume for the user is stored at a different PoP location, the master control facility may direct the preferred PoP location to create a cache or other temporary local storage for user data, and data from the user data volume on the other PoP location may be transferred on an as needed basis from the PoP server in the "home" location to the cache or temporary storage on the preferred Pop location. The virtual device can begin operating almost immediately using the portion of the user data that is initially transferred.

Embodiments disclosed herein can provide many advantages. One key is the separation of user-specific data volumes from a running server instance. This separation enables the creation of instances that do not store any state, and hence a Virtual Device can be instantiated for a user from a master image at any PoP facility that has the master image. For example, because the mobile devices can connect to PoP locations that are closer to them when they are roaming, the data latencies experienced by the mobile devices are reduced. Additionally, because the user data does not have to be replicated and maintained in multiple PoP locations, the amount of resources needed by the system can be reduced. Further, because the virtual devices instantiated at a roaming PoP location can start operating almost immediately using a small portion of the user data that is transmitted to the roaming PoP location and cached locally, the user does not experience large delays that might result from transferring an entire user data volume before beginning operation.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 6 depicts a diagrammatic representation of an example of virtualization server software architecture according to one embodiment.

DETAILED DESCRIPTION

Figure 1:
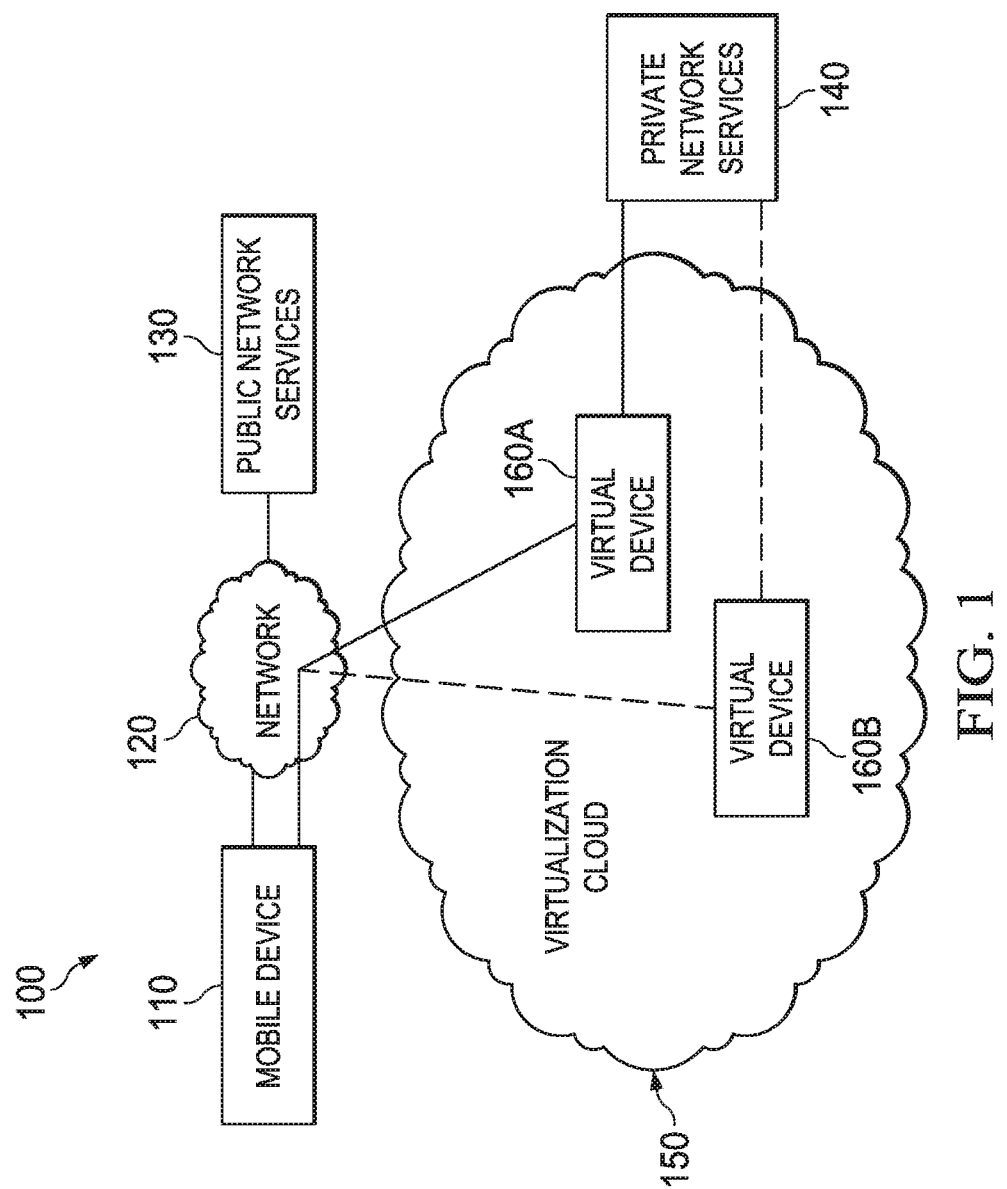
FIG. 1 depicts a diagrammatic representation of an example of an overall network environment in which embodiments disclosed herein may be implemented.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Embodiments of the present systems, methods and computer program products enable efficient roaming of mobile devices, where the mobile devices connect to corresponding virtual devices executing on a host server. In one embodiment, a system includes multiple point-of-presence (PoP) locations. Each of the PoP locations maintains a common set of master images from which corresponding virtual devices can be instantiated. A particular mobile device can access any one of the PoP locations, and the accessed PoP location will instantiate a virtual device of a type that matches the mobile device and the user's policies. The virtual device can execute applications and perform other functions that are typically performed locally on the mobile device itself. User data is maintained within one or more of the PoP locations, rather than on the mobile device.

The PoP locations could be interconnected by a network such as the Internet or by a private dedicated network. The system also includes a master control facility that manages interactions with the PoP locations. When a mobile device wishes to connect to the system, it communicates with the master control facility, which identifies a preferred one of PoP location and directs the mobile device to interact with the preferred PoP location. The preferred PoP location is generally selected to provide the best performance when interacting with the mobile device (e.g., communicating with the lowest latency), so that the user's experience is optimized. The preferred PoP location may or may not be the same as the home server on which the user's data is maintained. If the home PoP location is selected as the preferred PoP location, a virtual device is executed on a server at this location, and the virtual device accesses the user data that is already stored at the same location in a commonly accessed distributed storage area. If the preferred PoP location is not the same as the home server, a virtual device is executed on a server at the preferred PoP location facility, and user data is transmitted as needed from the home server to the preferred PoP location so that it can be utilized by the virtual device. The user data may, for example, be transferred to the preferred PoP location as needed and cached for use by the virtual device. This allows the mobile device to experience lower latency for its user experience, but is more efficient than duplicating all of the user's data on each of the PoP locations.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
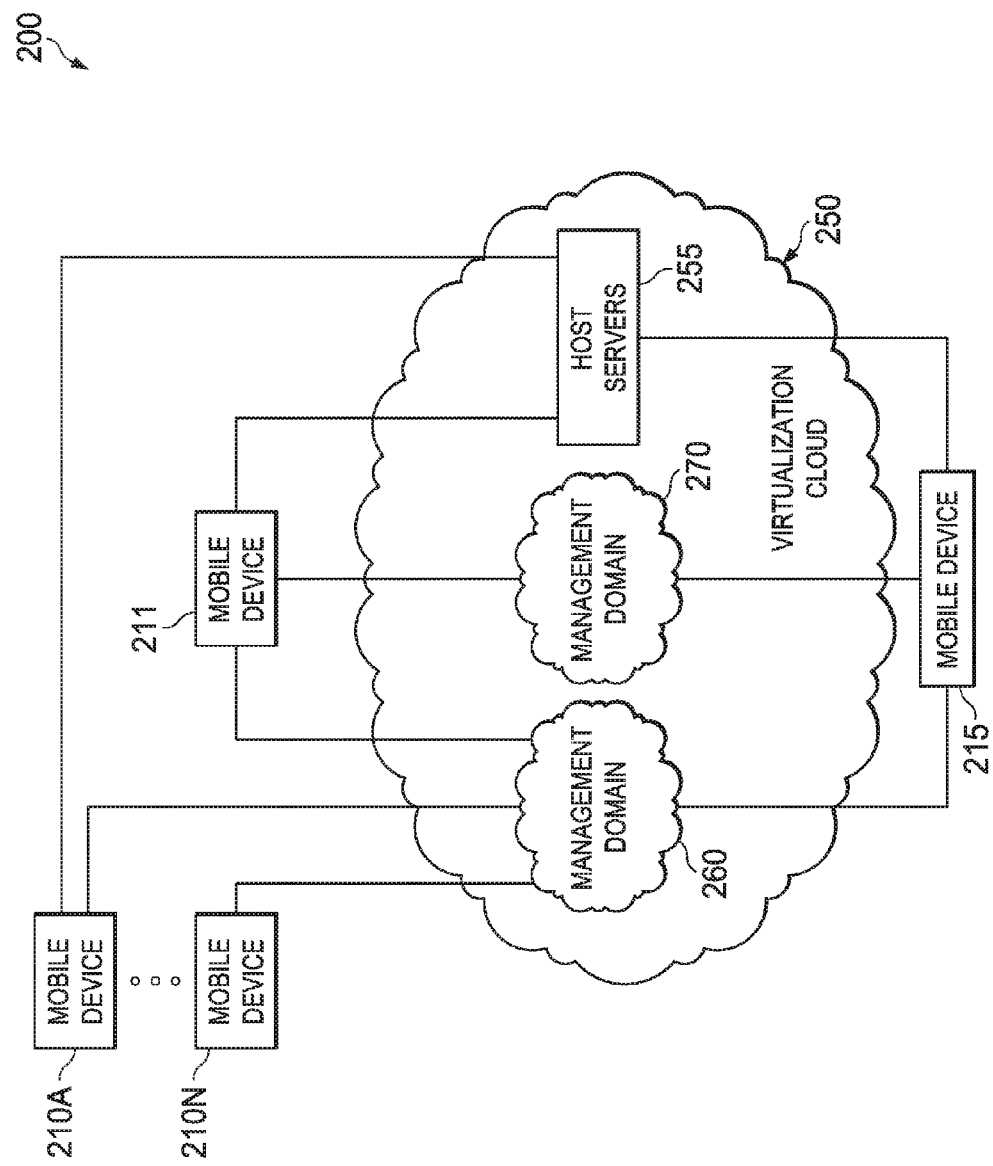
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A . . . 210N, 211, and 215. Mobile devices 210A . . . 210N, 211, and 215 may represent different types of actual touchscreen devices such as smartphones and tablets. Mobile devices 210A . . . 210N, 211, and 215 may be owned by the same or different entities (e.g., enterprises, users, etc.). Further, mobile devices 210A . . . 210N, 211, and 215 may be programmed with different operating systems such as iOS, Android, and Windows.

Each of mobile devices 210A . . . 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
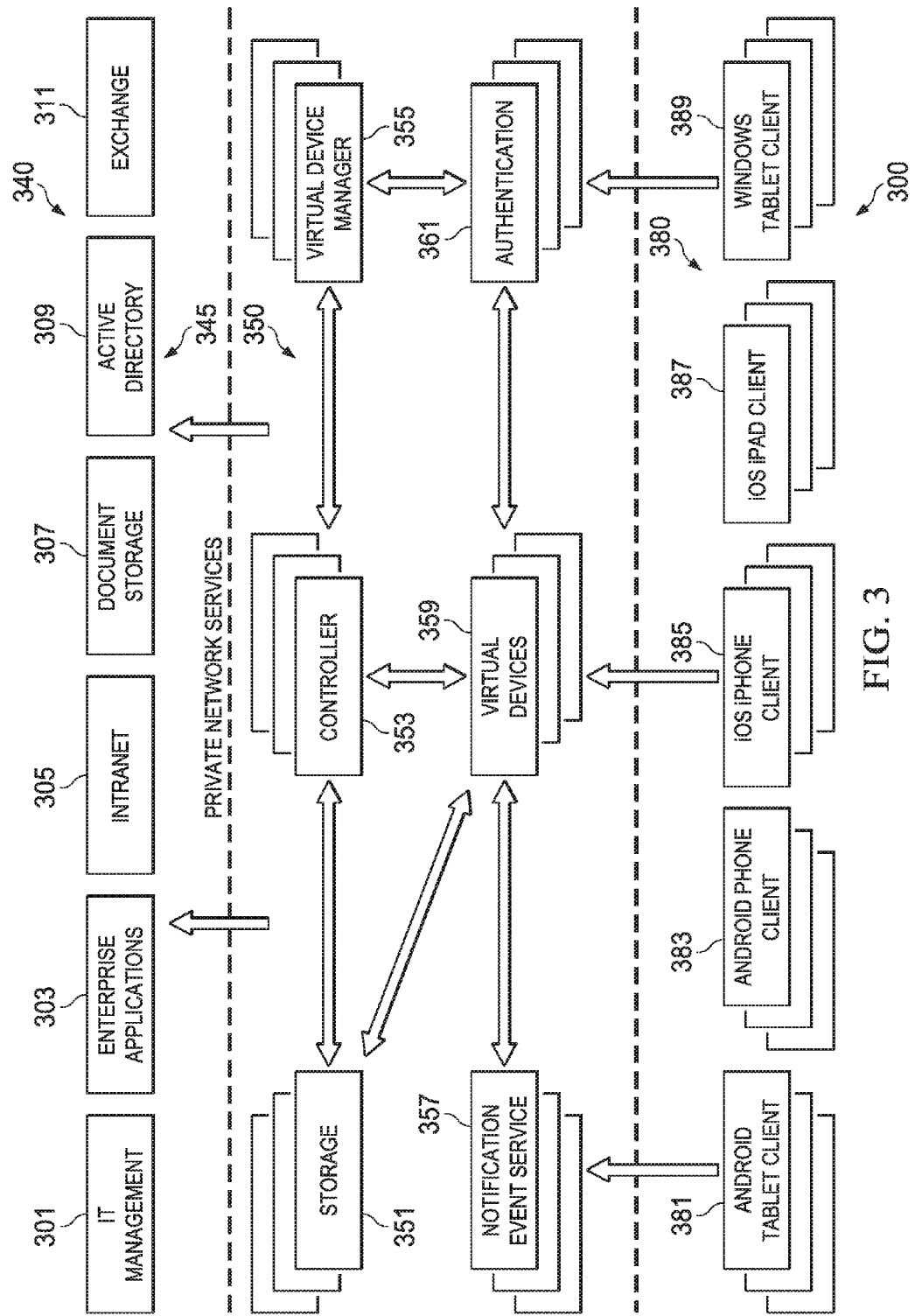
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A . . . . 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
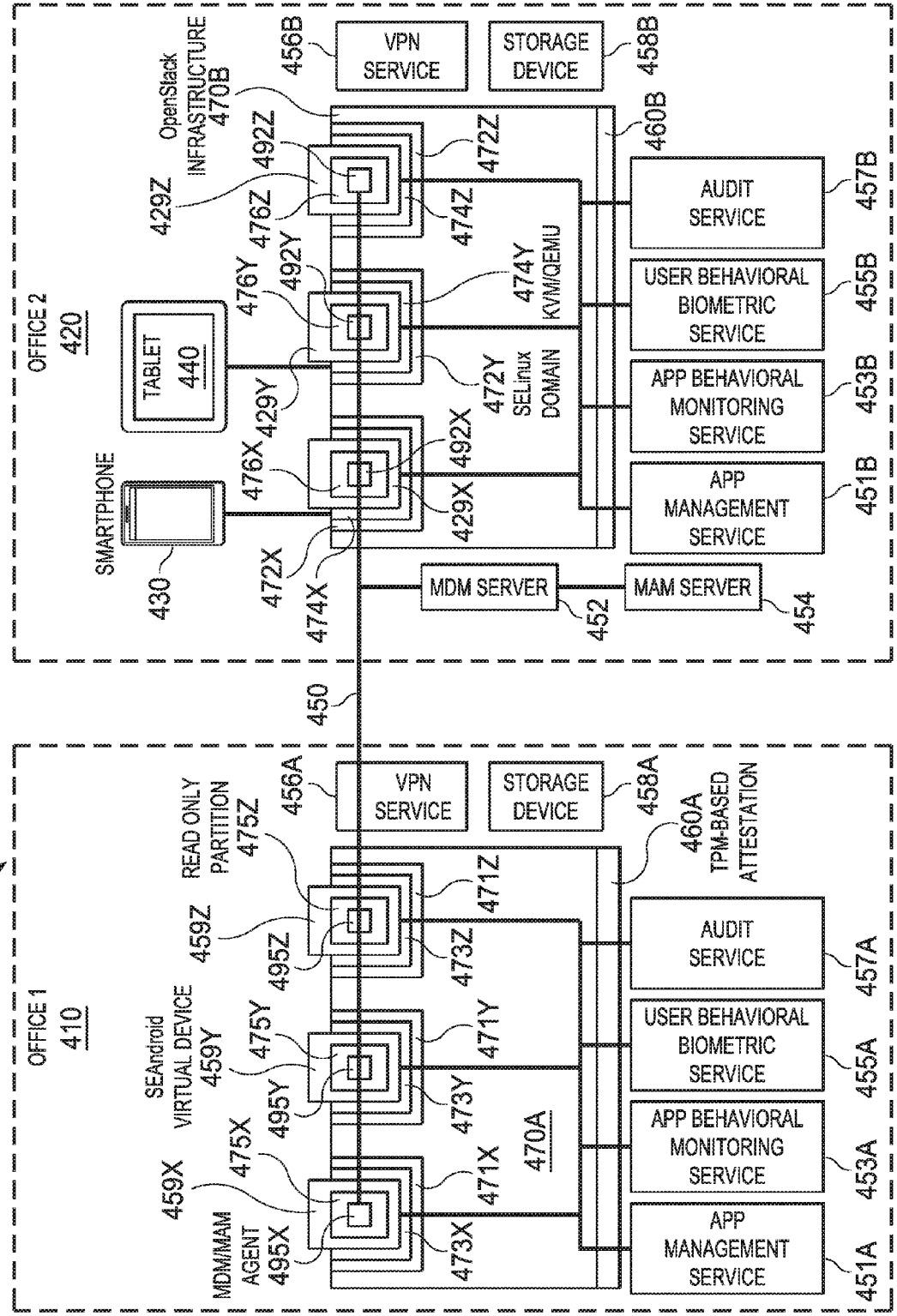
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using OpenStack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
  Scheduling specific times for upgrades to occur.
  Roll back to a previous device template if an error occurs.
  Partial, incremental upgrade processes across a user population.
  Detection of whether a user is active on a virtual device before enacting the upgrade.
  Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
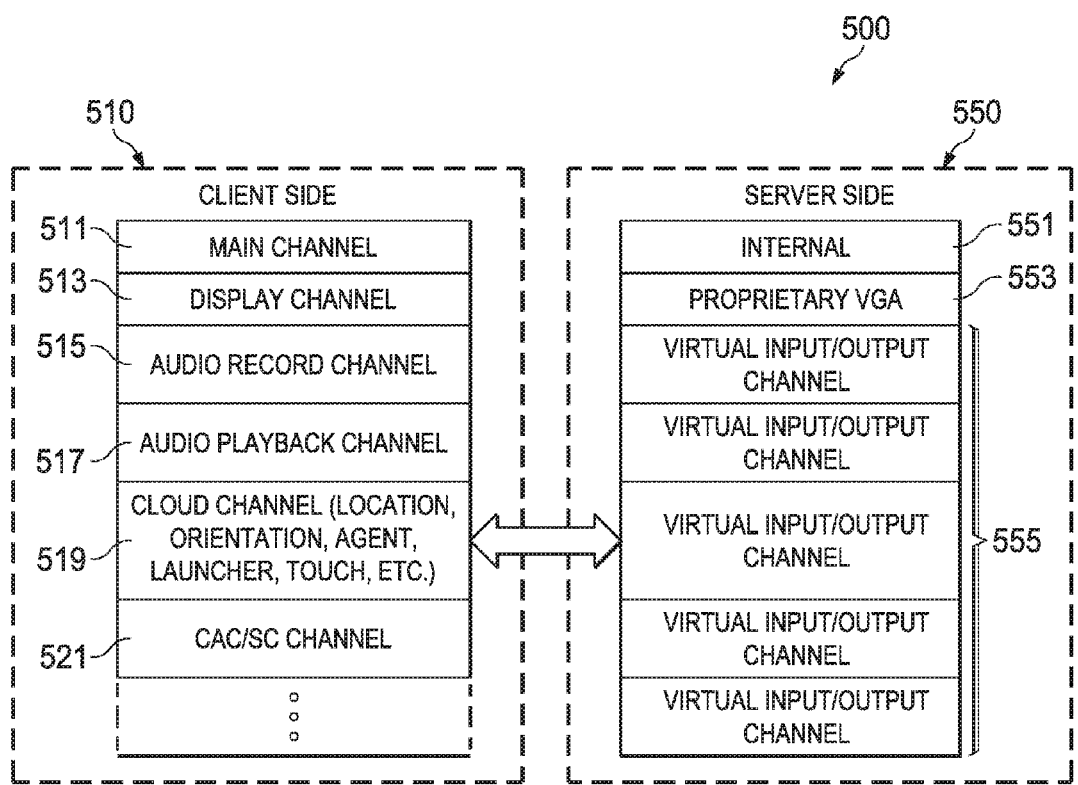
FIG. 5 depicts a diagrammatic representation of an example of a channel based device mapping architecture according to one embodiment.

FIG. 5 depicts a diagrammatic representation of an example of channel based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, etc.) to a server in the VC system (e.g., server side 550). Channel based device mapping architecture 500 may include a virtual device mapping module embodied on a non-transitory computer-readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's WiFi or data network. Instead, they use the Internet Protocol (IP)-based network services provided by the virtual device servers. In some embodiments, an "always-on" network interface may be provided to the applications. WiFi and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, WiFi signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver—optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manger 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

Figure 7A:
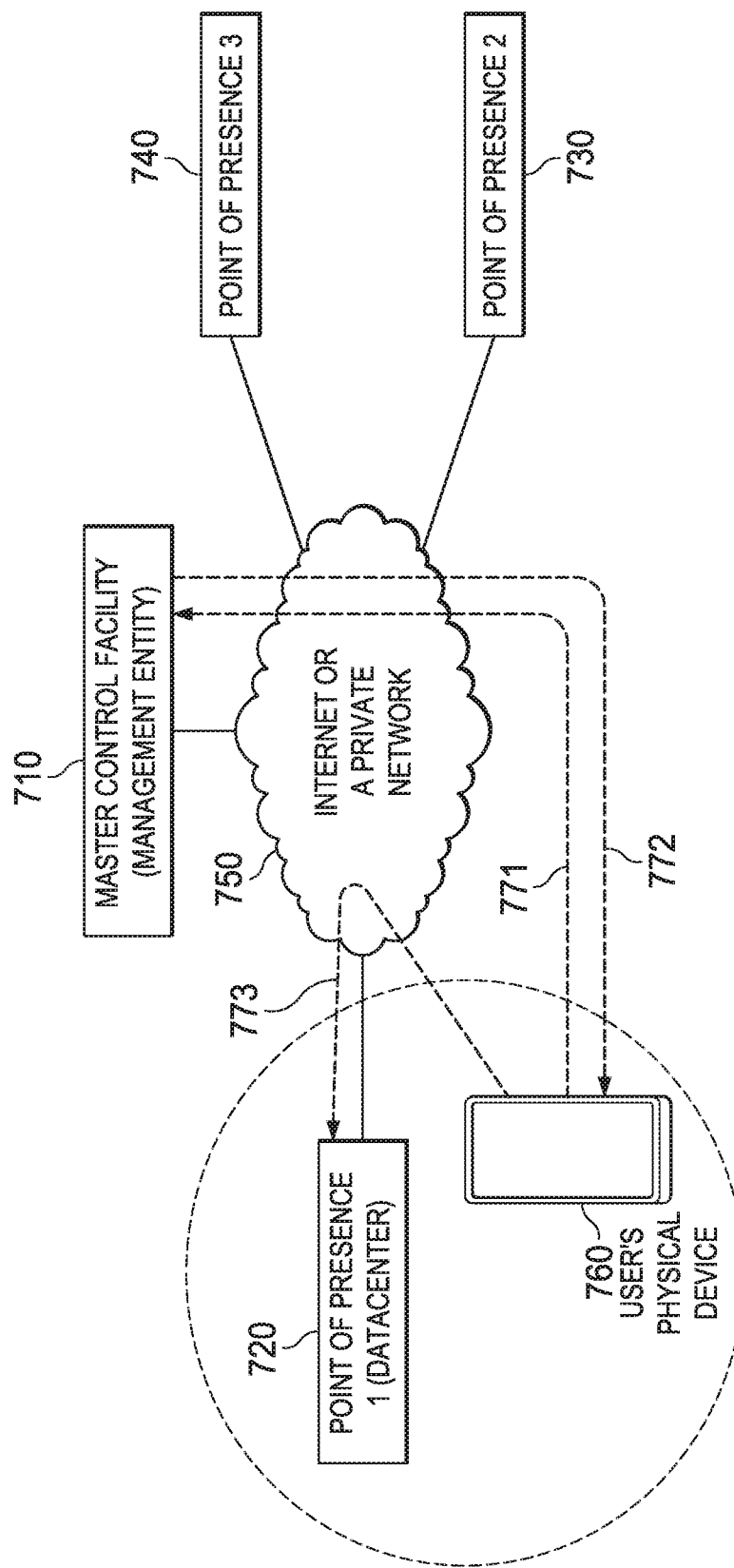
FIGS. 7A and 7B depict two diagrams illustrating the operation of a system according to one embodiment.
Figure 7B:
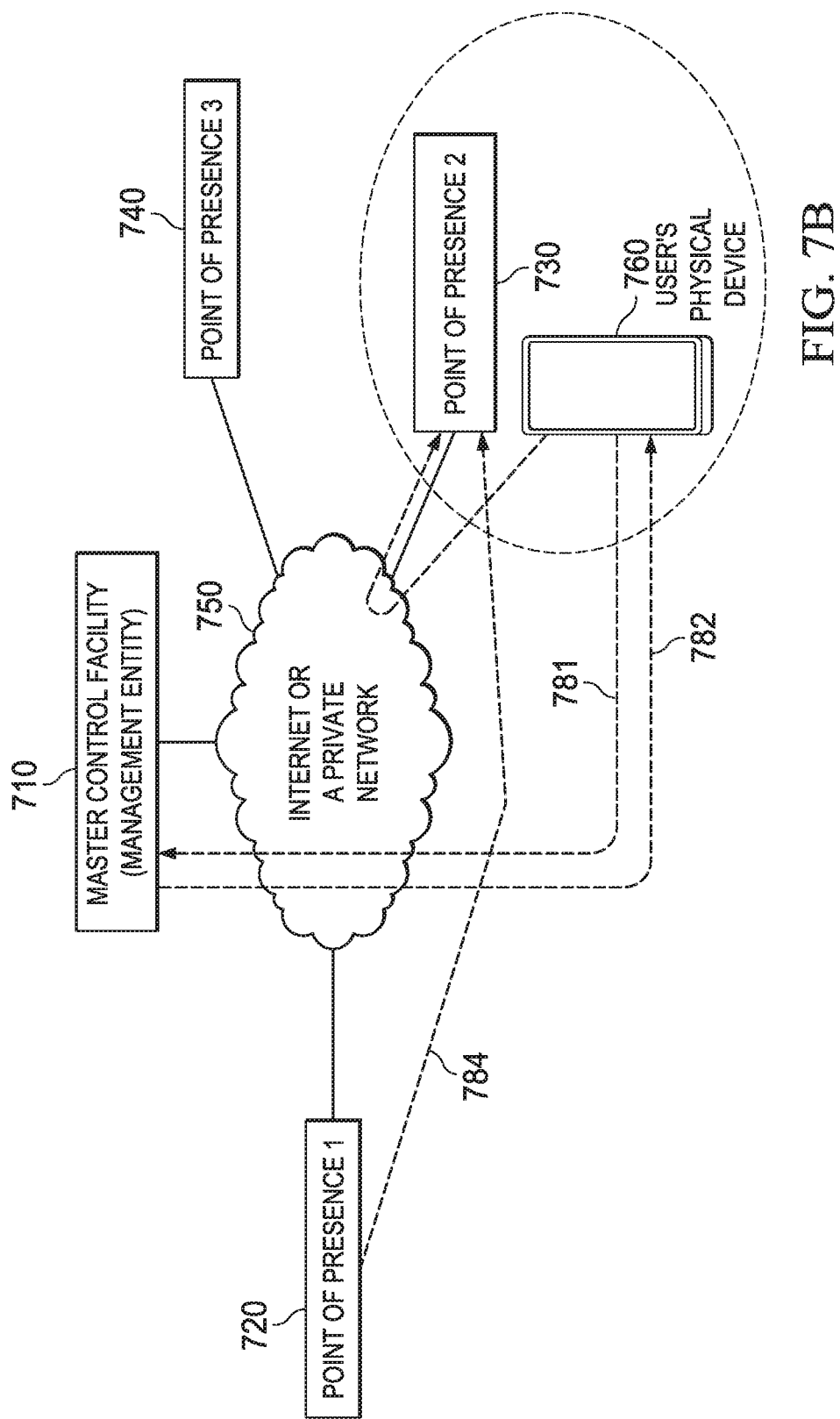

Referring to FIGS. 7A and 7B, two diagrams illustrating the operation of a system in accordance with one embodiment are shown. FIG. 7A depicts a scenario in which a mobile device is located in an area which is best served by a server at the first (home) PoP location. FIG. 7B depicts an alternate scenario in which the mobile device is roaming and is located in an area which is best served by an alternative (roaming) server running at the PoP location which is different from the first PoP location.

Referring to FIG. 7A, it can be seen that the system includes a master control facility (710) which is coupled to three PoP locations (720, 730, 740) via a network (750). Each of PoP locations 720, 730, 740 is configured to host one or more virtual devices and includes a common set of master images that are used to instantiate these virtual devices. A mobile device (760) can be connected to one of the PoP locations, and more specifically to a virtual device executing on the PoP location as described above. The virtual device can be instantiated and executed on any one of the PoP locations. For a given user, only one of the PoP locations provides persistent storage for that user's data.

For the purposes of this disclosure, the term PoP locations is used to refer to a collection of resources that may include computing resources, memories, data storage, I/O devices, and various other hardware, software and firmware components that may be necessary or desirable to perform the functions described herein. A PoP location that persistently stores a particular user's data may be referred to as the home server for that user, while other PoP locations may be referred to as roaming servers.

FIG. 7A includes three arrows (771-773) that show corresponding stages of operation of the system. When mobile device 760 initially attempts to connect to the system, a communication containing identity and location information is sent from the mobile device to the master control facility (771) to establish an authorization token. Based upon this information communicated from mobile device 760, master control facility 710 determines which PoP location would best serve the mobile device. In the scenario of FIG. 7A, mobile device 760 is within an area served by PoP location 720. Consequently, master control facility 710 directs PoP location 720 to instantiate a virtual device and sends a message (772) back to mobile device 760 which indicates that the mobile device should connect to PoP location 720.

Mobile device 760 then begins communicating (773) with PoP location 720 and the virtual device executing on PoP location 720.

FIG. 7B depicts the same system as FIG. 7A. In the scenario of FIG. 7B, however, mobile device 760 is located within the area served by PoP location 730. When it is desired to connect mobile device 760 to the system, the mobile device again sends a communication (781) to master control facility 710. Master control facility receives this communication and again makes a determination as to which PoP location would best serve mobile device 760. Since, in this scenario, mobile device 760 is within the area of PoP location 730, master control facility 710 determines that this PoP location would best serve the mobile device (instead of PoP location 720). Master control facility 710 therefore directs PoP location 730 to instantiate a virtual device and communicates this (782) to mobile device 760. Mobile device 760 then begins communicating (783) with PoP location 730 and the virtual device executing on PoP location 730.

As noted above, PoP location 720 is the home location associated with the user of mobile device 760. Consequently the user's data is stored within PoP location 720. Thus, although PoP location 730 instantiates and executes a virtual device corresponding to mobile device 760, it does not already have the user's data, so this data is transmitted (784) from PoP location 720 to PoP location 730. In one embodiment, the user's data is transferred as needed between the PoP locations, and is stored in transient storage on PoP location 730. In one embodiment, the data is stored in a write-through cache in PoP location 730. When mobile device 760 discontinues the connection to the virtual device executing on PoP location 730, the user data which has been cached on the server may be discarded, since it has been written back to the persistent store of PoP location 720.

Figure 8A:
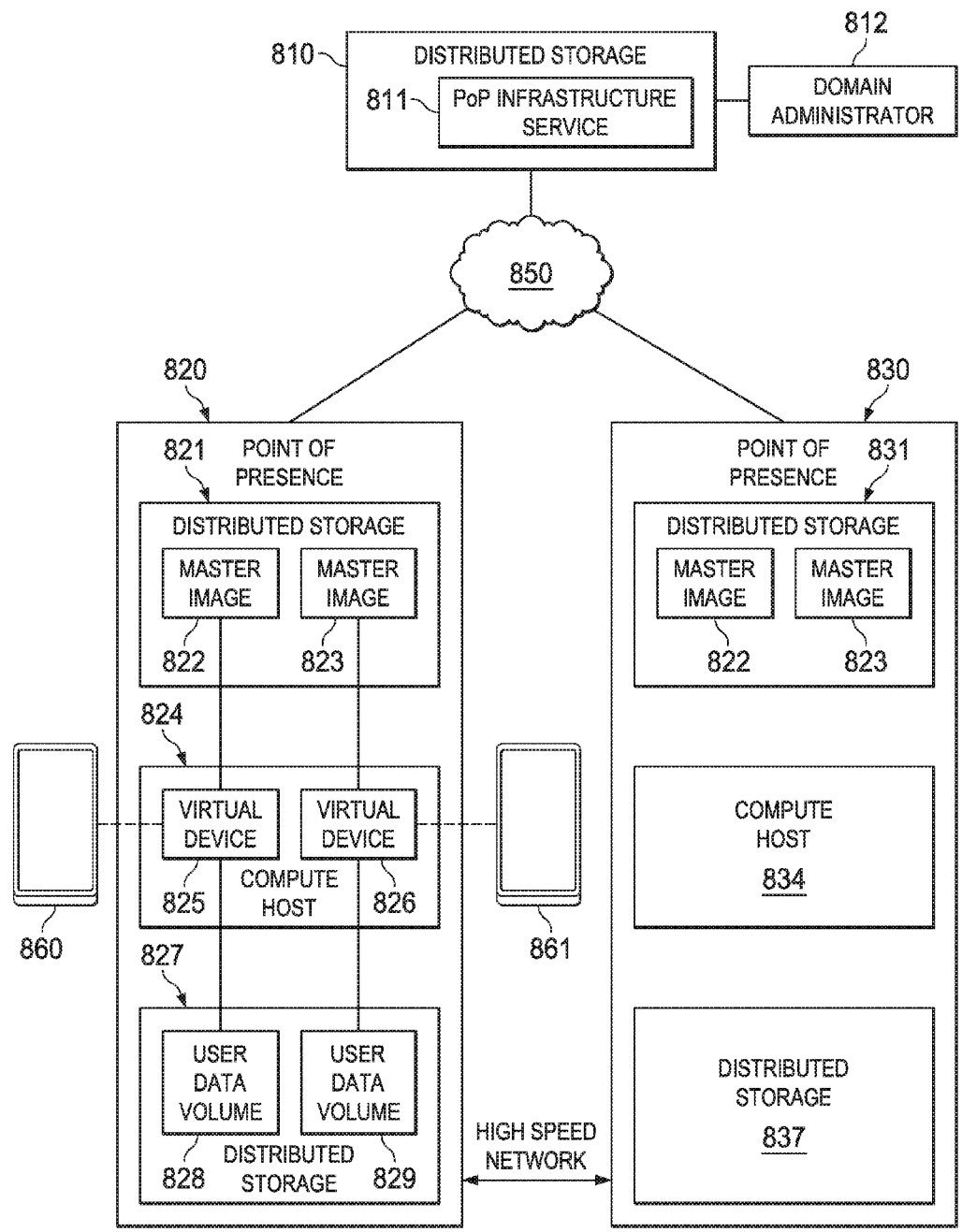
FIGS. 8A and 8B depict two diagrams illustrating the structures of a PoP location of one embodiment in more detail.
Figure 8B:
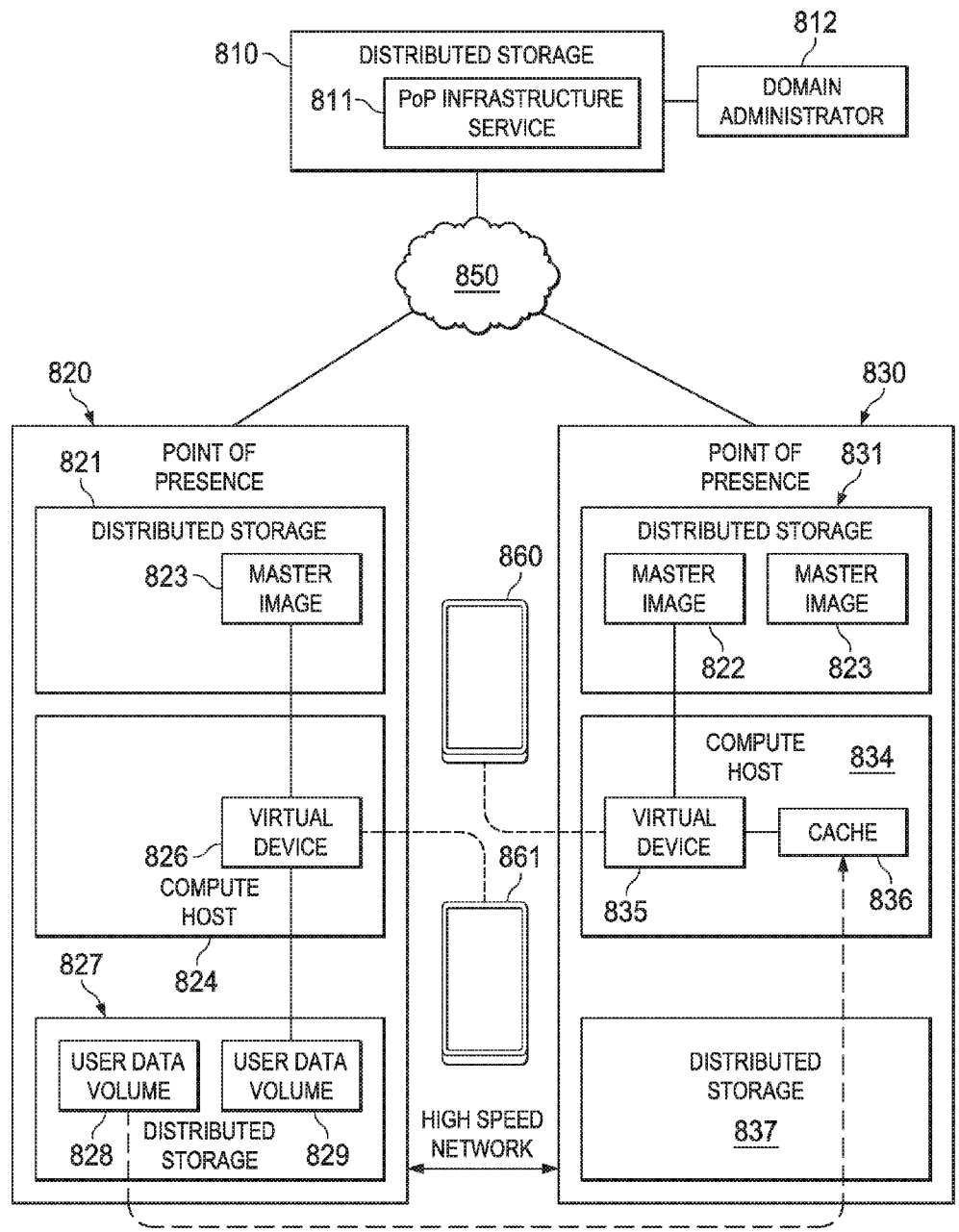

Referring to FIGS. 8A and 8B, two diagrams illustrating the structures of the PoP locations in more detail are shown. FIG. 8A depicts a scenario in which two mobile devices are located in an area which is best served by a first PoP location. FIG. 8B depicts an alternate scenario in which one of the mobile devices remains in the area best served by the first PoP location, while the second mobile device is roaming in the area best served by a second PoP location.

As depicted in FIG. 8A, master control facility 810 is connected through network 850 to two PoP locations (820, 830). Master control facility 810 has a PoP infrastructure service 811 that enables management of PoP locations 820 and 830 by a domain administrator 812. PoP infrastructure service 811 will be described in more detail below.

PoP location 820 includes two different types of distributed storage, as well as compute host resources. Distributed storage 821 is used to store a set of master images (e.g., 822, 823). In one embodiment, distributed storage 821 is a read-only memory that does not allow any changes to the master images, except by an administrator. These master images are used by PoP location 822 to instantiate virtual devices (e.g., 825, 826) on compute host 824. Each of the master images is an image of a virtual device that corresponds to a physical device that may be connected to the PoP location. In one embodiment, each master image uses a specific operating system that would be found on the corresponding mobile device, and has a configuration similar to the physical device. The master image may also include one or more applications that could be executed on the mobile device. The set of master images may include multiple images corresponding to the same physical device, but having different configurations or applications. The set of master images may also include images corresponding to different physical devices with either similar or distinct configurations and/or applications.

As depicted in FIG. 8A, two mobile devices are within the area served by PoP location 820, and are connected to virtual devices that are executing on this PoP location. Mobile device 860 is connected to virtual device 825, which was instantiated from master image 822. While virtual device 825 is typically configured to mimic physical device 860, the virtual device instantiated from the master image does not include any data that is specific to the user of physical device 860. This data is separately stored in distributed storage 827 as user data volume 828.

Mobile device 861 is connected to PoP location 820 in essentially the same manner as mobile device 860. Mobile device 861, however, is connected to a second virtual device 826. Virtual device 826 was instantiated from a different master image (823) than virtual device 825, and is therefore configured according to the second master image rather than the first. Virtual device 826 utilizes data that is contained in a second user data volume (829) that is stored in distributed storage 827.

FIG. 8A also includes second PoP location 830. PoP location 830 is set up in the same manner as PoP location 820, with a first distributed storage 831, a compute host 834 and a second distributed storage 837. As shown in the figure, distributed storage 831 stores the same set of master images (822, 823) that are stored by PoP location 820. Since this common set of master images is stored on both PoP locations, virtual devices corresponding to mobile devices 860 and 861 could be instantiated on either of the PoP locations using the PoP location's own, local master images. This allows the PoP locations to quickly instantiate a virtual device so that a mobile device can be connected to the server (and the virtual device). Since, however, neither of the mobile devices (860, 861) is within the area served by PoP location 830, no virtual devices have been instantiated on compute host 834.

Referring to FIG. 8B, a second scenario involving the same system depicted in FIG. 8A is shown. In this scenario, mobile device 861 is within the area served by PoP location 820, so PoP location 820 has instantiated a virtual device 826 that is connected to mobile device 861. As in FIG. 8A, virtual device 826 utilizes user data in volume 829.

In the scenario depicted in FIG. 8B, mobile device 860 is within the area served by PoP location 830. Thus, when mobile device 860 initially connects to the system, master control facility 810 provisions resources on PoP location 830 to execute a virtual device that will be connected to mobile device 860. This virtual device (835) is instantiated from same master image (822) that was used in the scenario of FIG. 8A, but it is instantiated from the copy of the master image that is stored on the local distributed storage (831) of PoP location 830. Since the user data volume (828) associated with the user of mobile device 860 is stored on a different PoP location (820) than the PoP location that hosts the virtual device (835), the user data must be transferred from PoP location 820 to PoP location 830 so that it can be used by the virtual device.

In this embodiment, the data which is needed by the virtual device is transferred via a high-speed network and is stored in cache 836. The system does not transfer all of the data in the user volume, but instead transfers only a portion that is needed by the virtual device. The virtual device can then perform any desired operations without having to wait for the transfer of the entire user data volume to PoP location 830. The specific methodology used in the data transfer may vary from one embodiment to another. In one embodiment, a block transfer scheme is used. Under this scheme, when a particular piece of information is needed, the system identifies a block of data that includes the required information and transfers the entire block of data to cache 836. Although the transferred block may include data that was not required by the virtual device, the associated overhead is typically less than the overhead that would be required to identify specific pieces of information within the block and separately transfer only those pieces of information.

Figure 9A:
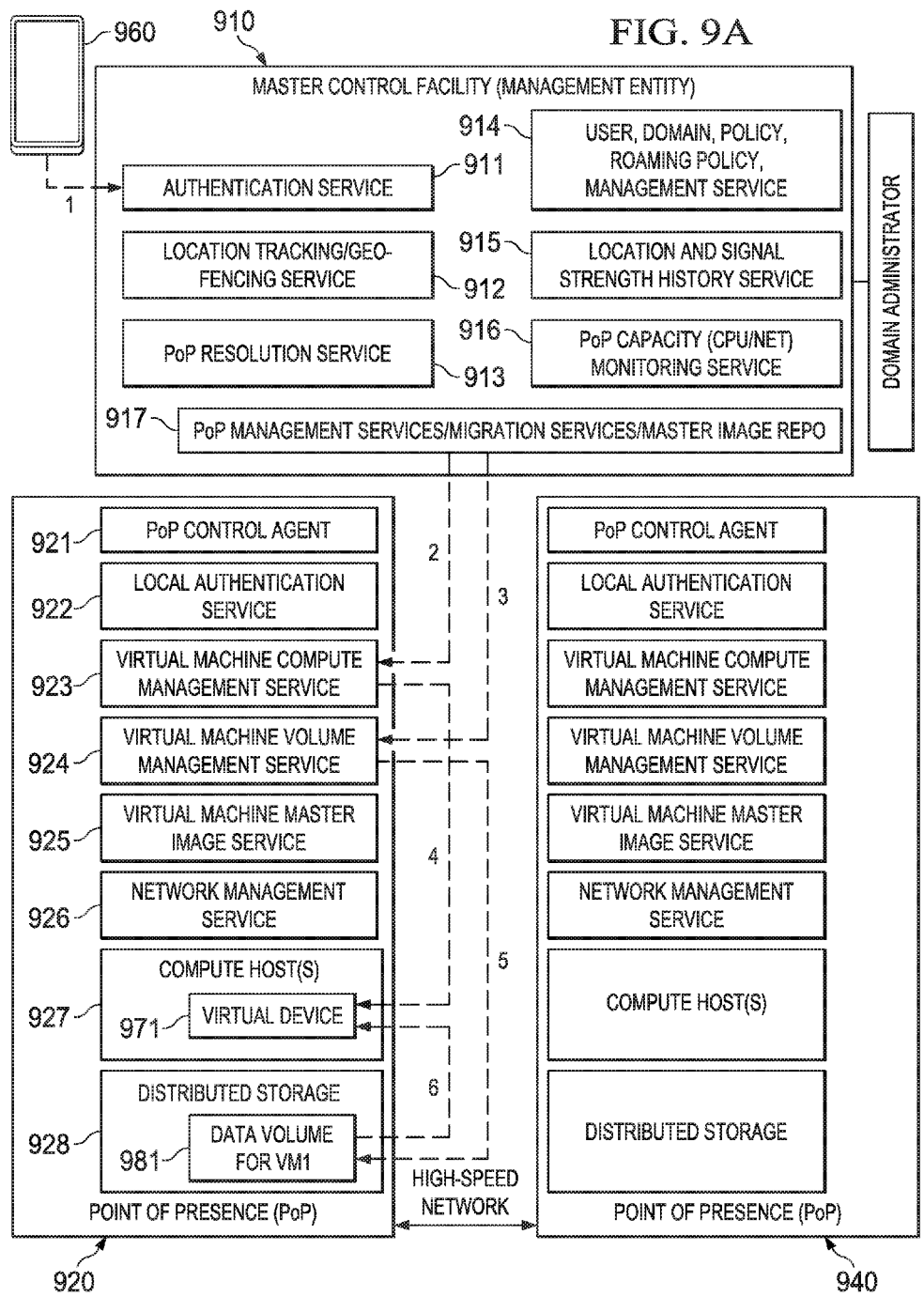
FIGS. 9A and 9B depict a pair of diagrams illustrating the interaction of various components within a master control facility and PoP locations in one embodiment.
Figure 9B:
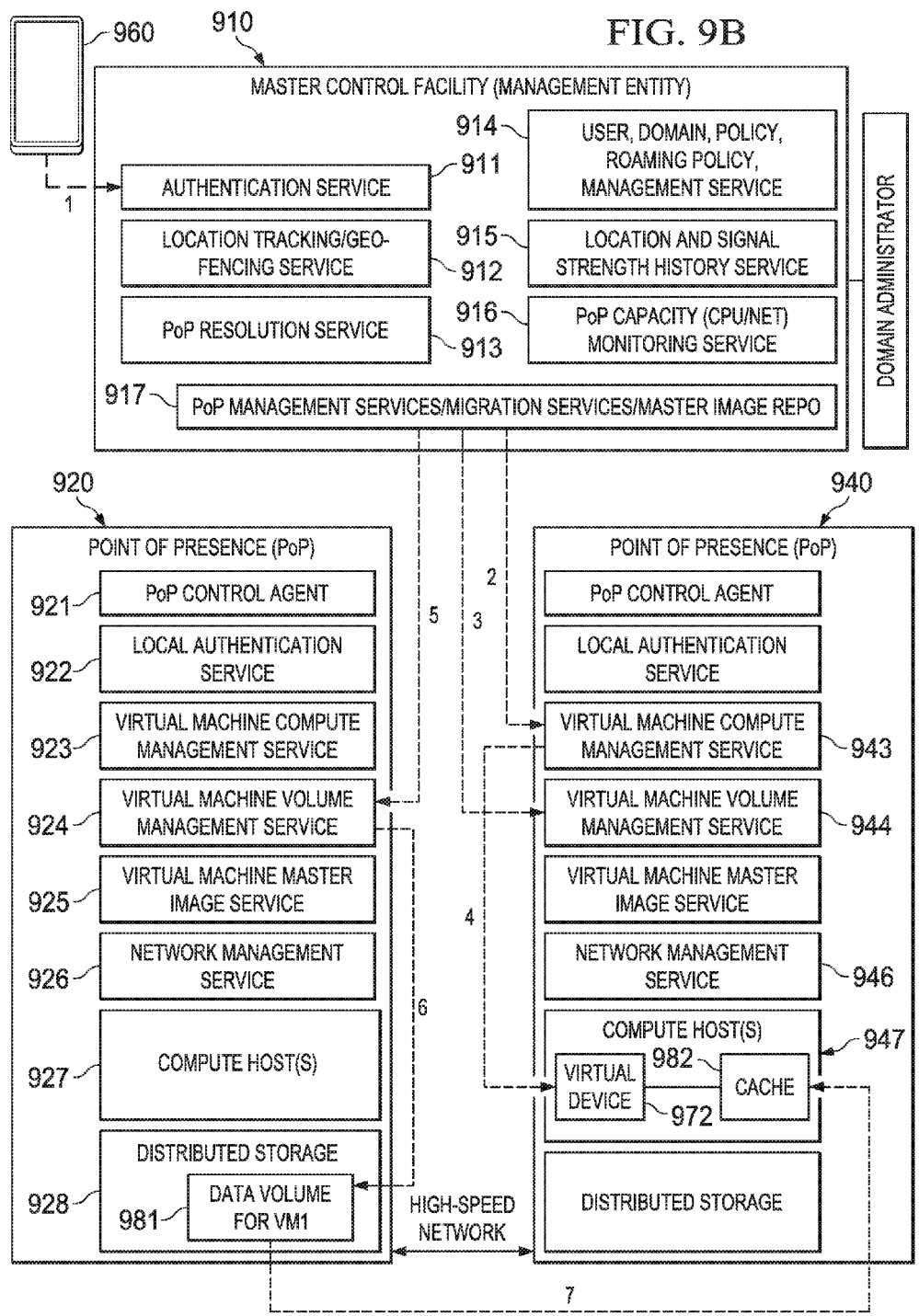

FIGS. 9A and 9B are a pair of diagrams illustrating the interaction of various components within the master control facility and PoP locations in one embodiment. FIG. 9A depicts the connection of a mobile device to its home PoP location, while FIG. 9B depicts the connection of the mobile device to a PoP location other than its home location.

Referring to FIG. 9A, a diagram illustrating the interaction of components within the master control facility and PoP location in an exemplary embodiment is shown with example interactions 1-6. In this embodiment, mobile device 960 is within the area served by PoP location 920, which is the home location for the mobile device and consequently stores the user data associated with the mobile device. Mobile device 960 initiates the process of connecting to the PoP location by transmitting a message containing identity and location information to master control facility 910. The information is authenticated by authentication service 911 and is processed to determine the PoP location to which the mobile device should be connected. This involves a number of modules within the master control facility. For example, module 912 (the location tracking/geo-fencing service) determines the location of the mobile device so that this can be used in determining which PoP location is closest to the device and may therefore have the lowest latencies in communications with the device. The location of the mobile device may also be taken into account by module 914 (the policy management service) which manages the administrative policies that are applicable to the choice of PoP locations. Module 915 (the location and signal strength history service) manages information relating to the location and the signal strength that has historically been provided by each of the PoP locations. Module 916 (the PoP capacity monitoring service) monitors the capacity of the PoP locations so that the system can perform load-balancing and avoid latency increases resulting from using overloaded servers. Module 913 (the PoP resolution service) evaluates the available information and selects one of the PoP locations that is able to provide the best service to the mobile device. After selecting the PoP server, master control facility 910 returns an authentication token containing the PoP server's network address to mobile device 960.

When one of the PoP locations has been selected for the connection to mobile device 960, module 917 communicates with the selected PoP location (in this case, PoP location 920) and begins the process of provisioning resources for the virtual device that will be connected to the physical mobile device. PoP location 920 includes a pop control agent 921 that manages its communications with master control facility 910, and may pull information from the master control facility. The PoP location may perform its own authentication of the mobile device by providing the authentication token to local authentication service 922. Module 917 of the master control facility initiates the provisioning of a virtual device by contacting module 923 (the virtual device compute management service), which manages the compute hosts on which the virtual devices are executed, as well as module 924 (the virtual device volume management service). The virtual device compute management service also manages the user data volumes that are stored in distributed storage 928. The virtual device compute management service instantiates a virtual device using one of the master images from the virtual device master image service 925. In this case, virtual device 971 is instantiated for connection to mobile device 960. Virtual device volume management service 924 accesses distributed storage 928 to attach data volume 981 to virtual device 971 and enable use of the data volume by the virtual device.

FIG. 9B depicts the same system as FIG. 9A, but the mobile device (960) is within the area served by PoP location 940, rather than PoP location 920. Referring to example interactions 1-7, in this instance, when mobile device 960 contacts master control facility 910, the authentication of the information received from the mobile device and the subsequent selection of a PoP location that will best serve the mobile device proceeds in the same manner as described above in connection with FIG. 9A. In this case, however, the master control facility makes a determination that the mobile device would best be served by PoP location 940. Master control facility 910 therefore communicates to PoP location 940 that it should instantiate a virtual device to be connected to mobile device 960. In response to this communication, the virtual device compute management service (943) of PoP location 940 instantiates a virtual device (972) on compute host 947. If a virtual device corresponding to mobile device 960 was already executing on compute host 927 of PoP location 920, the master control facility directs PoP location 920 to terminate this virtual device, which may have continued to execute on the PoP location while mobile device 960 was disconnected from it.

Because the user data volume for the mobile device is not stored on PoP location 940, the PoP management services/migration services module (917) of the master control facility communicates with PoP location 920 to direct the transfer of data from data volume 981 to a cache 982 for virtual device 972 on PoP location 940. The data is transferred from PoP location 920 to PoP location 940 via a high-speed network. The data transfer is managed by the network management service modules (926, 946) of the respective PoP locations. Preferably, PoP location 920 initially transfers only a small portion of the data that is needed for virtual device 972 to begin operating. As additional data is needed, it can be transferred from PoP location 920 to PoP location 940. In certain situations (e.g., when the user will remain in the same area for an extended period time), it may be desirable to transfer the entire data volume to PoP location 940.

The master control facility may include components that track and maintain data that relates to the user sessions, but is outside the user space of the individual sessions. For example, the master control facility may maintain audit log data for the user sessions, or transfer behavioral biometric data (e.g., touch data) or cryptographic materials (e.g., public and private keys) from a home server to the preferred server. The master control facility may also log all roaming actions that are performed and monitor these actions for abnormal roaming behavior, such as a user initially connecting to a US-based then connecting to a UK-based server 30 minutes later. The master control facility may flag such abnormal behavior for administrative action.

Figure 10:
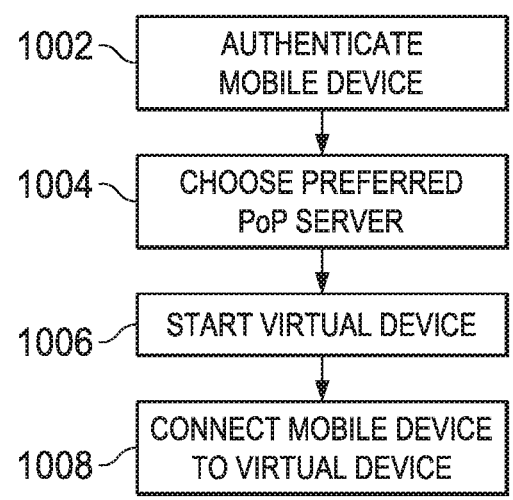
FIG. 10 depicts a method for connecting a mobile device to a virtual device in one embodiment.

Referring to FIGS. 10-15, a set of flow diagrams is shown. These diagrams illustrate the operation of an exemplary system for connecting a mobile device that may be roaming from one location to another to a virtual device that may be hosted by any of a plurality of PoP locations. FIG. 10 depicts the overall method for connecting the mobile device to the virtual device. Each of FIGS. 11-15 illustrates, in more detail, one of the steps of FIG. 10.

As depicted in FIG. 10, the overall method includes four basic steps. First, when the mobile device attempts to connect to the system, it must be authenticated by the system to ensure the security of the system (1002). After the mobile device is authenticated, it must be determined which PoP location will host the virtual device to which the mobile device is to be connected (1004). When the proper PoP location has been selected, the system instantiates virtual device on the selected server and attaches the appropriate user data to the virtual device (1006). When the virtual device has been fully booted, the mobile device is connected to it (1008), and the mobile device is ready for use.

Figure 11:
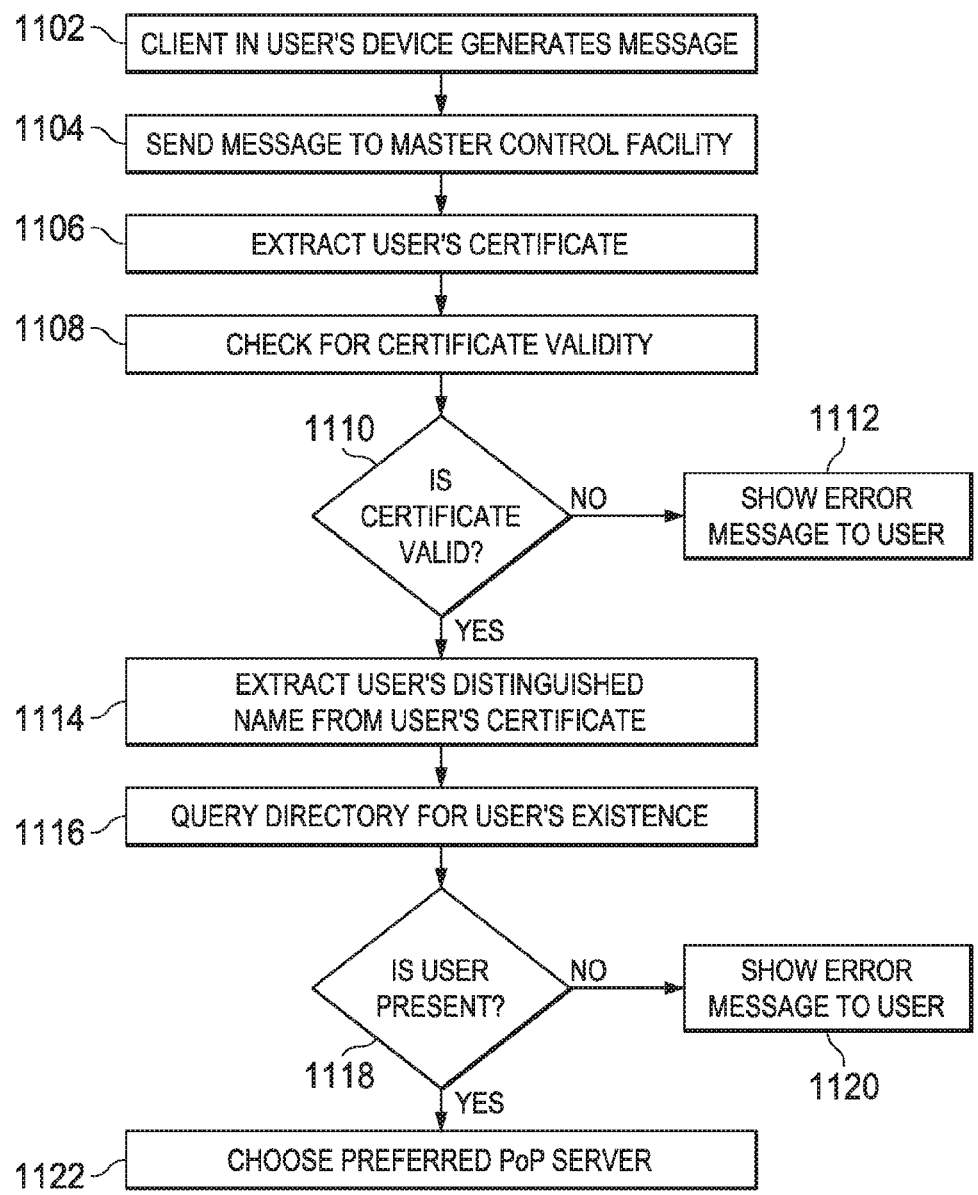
FIG. 11 depicts a flow diagram illustrating in greater detail the authorization step of FIG. 10.

Referring to FIG. 11, a flow diagram illustrating in greater detail the authorization step (1002) of FIG. 10 is shown. When it is desired for the mobile device to connect to the system, a client module in the mobile device generates an authorization message (1102). The authorization message may include identifying information about the user. For example, the authorization message may include a name/password, a location (such as GPS coordinates of the physical device), a public certificate for the user, additional password or login credentials, etc. The authorization message is cryptographically signed and transmitted by the mobile device to the master control facility (1104). The authentication service extracts the user certificate from the authorization message (1106) and checks the certificate to determine whether or not it is valid (1108). If the user certificate is not valid (1110), an error message is returned to the client (1112), and the process terminates. If the user certificate is valid (1110), the master control facility extracts a user identifier from the user certificate (1114) and queries a user directory to determine whether or not the system is available to the user (1116). If the user is not found in the directory (1118), an error message is returned to the client (1120). If the user is found in the directory (1118), the system proceeds to determine which PoP location will best serve the client, as described in connection with FIG. 12 below. As described above, a cryptographically signed "package" of data (e.g., a token) is returned by the authentication service to the client and is used to authenticate the user so it can communicate with one or more services (for instance, a PoP server).

Figure 12:
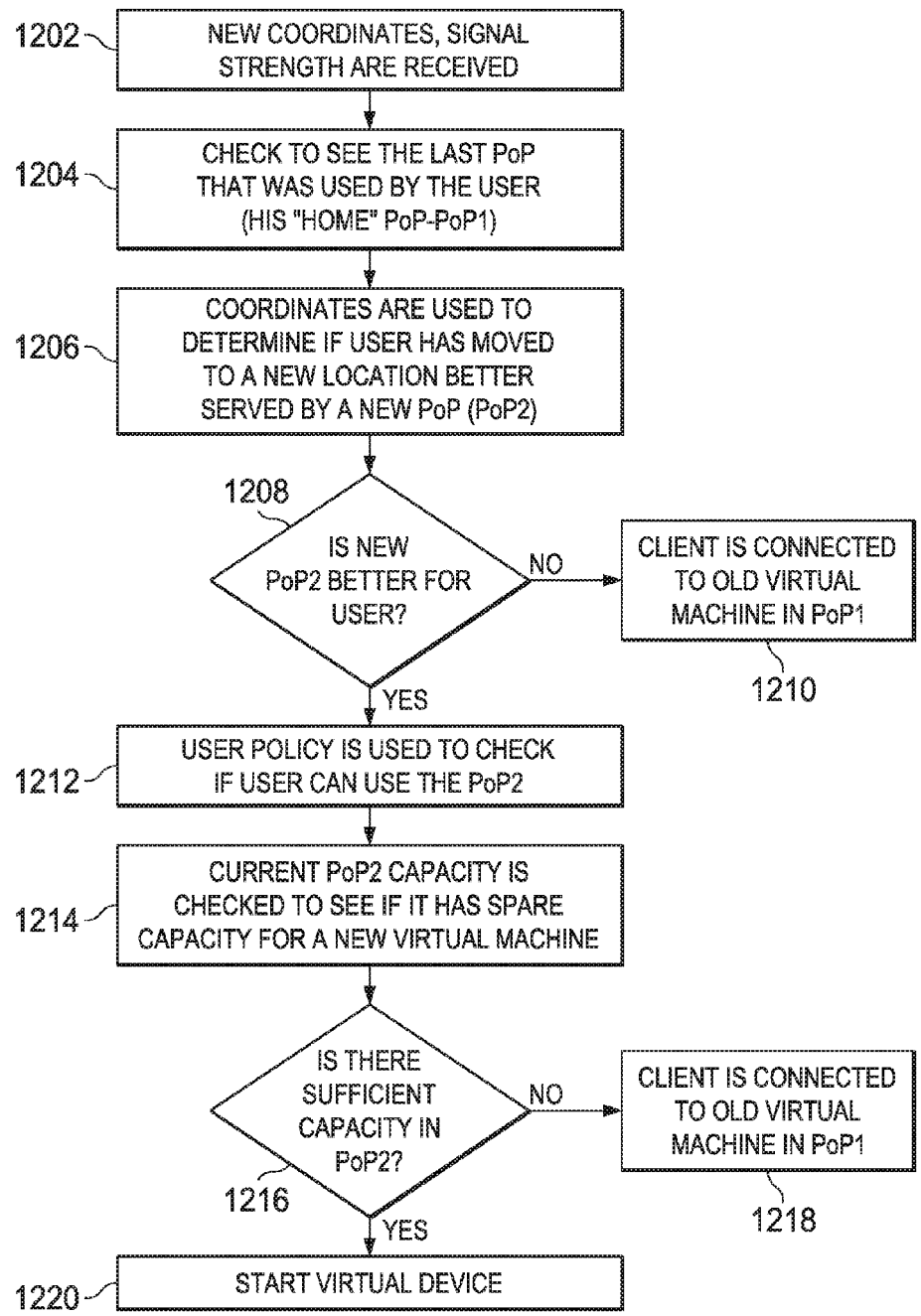
FIG. 12 depicts a flow diagram illustrating in greater detail the PoP locations selection step of FIG. 10.

Referring to FIG. 12, a flow diagram illustrating in greater detail the PoP location selection step (1004) of FIG. 10 is shown. Initially, the master control facility receives the GPS coordinates from the authorization token, as well as the signal strength of the communications from the mobile device (1202). The master control facility determines the last PoP location that was used by the client (1204) and, based upon the GPS coordinates, determines whether the mobile device has moved to a location that is better served by a new PoP location (1206). This may involve, for example, determining whether the user's GPS coordinates indicate that the user's location has changed by a threshold amount since his or her last session. This determination makes use of the pop resolution services of the master control facility. If it is determined that the mobile device is not better served by a new PoP location (1208), the client is directed to the old PoP location and, if a virtual device associated with the client is already executing on the old server, the client is connected to that virtual device (1210). If it is determined that the mobile device is better served by a new PoP location (1208), the master control facility checks the applicable policies using its user policy management service to determine which PoP locations may be available to the client (1212). The available PoP locations are checked to determine whether they have additional capacity that can be provisioned for a new virtual device (1214). If there is insufficient capacity on the new PoP locations (1216), the client is directed to the old PoP location (1218), and the system either connects to an existing virtual device or starts a new virtual device on the old PoP location as described in connection with FIG. 13 below. If there is capacity on the new PoP locations, a preferred one of these servers is selected (1220).

When the user is not best served by the home server, a preferred PoP location may be selected based on a number of factors. First, the system may have various administrative policies that affect the choice of the preferred server. For instance, there may be restrictions on which servers are available to a particular user based on the user's identity, geographical location, service level, etc. This information may be maintained by the master control facility, the client application on the mobile device, or other components of the system. Within the set of servers that are available to the user based on policy considerations, selection of the preferred server may be based on one or more performance measures that indicate which of the servers is likely to have the best performance (e.g., lowest latency in communications with the mobile device). These performance measures may include, for example, ping times, system availability, available bandwidth, network jitter, packet loss, and the like. The performance measures may be current or historical, and may be based on directly measured characteristics (e.g., ping times) or more complex aggregations of multiple factors (e.g., performance ratings over multiple user sessions). The selection of the preferred server may involve input from the user (e.g., explicit selection of a server), or it may be made automatically by the system. Once a preferred server is selected, the system proceeds to start a virtual device on the selected PoP location as described in connection with FIG. 14 below.

Figure 13:
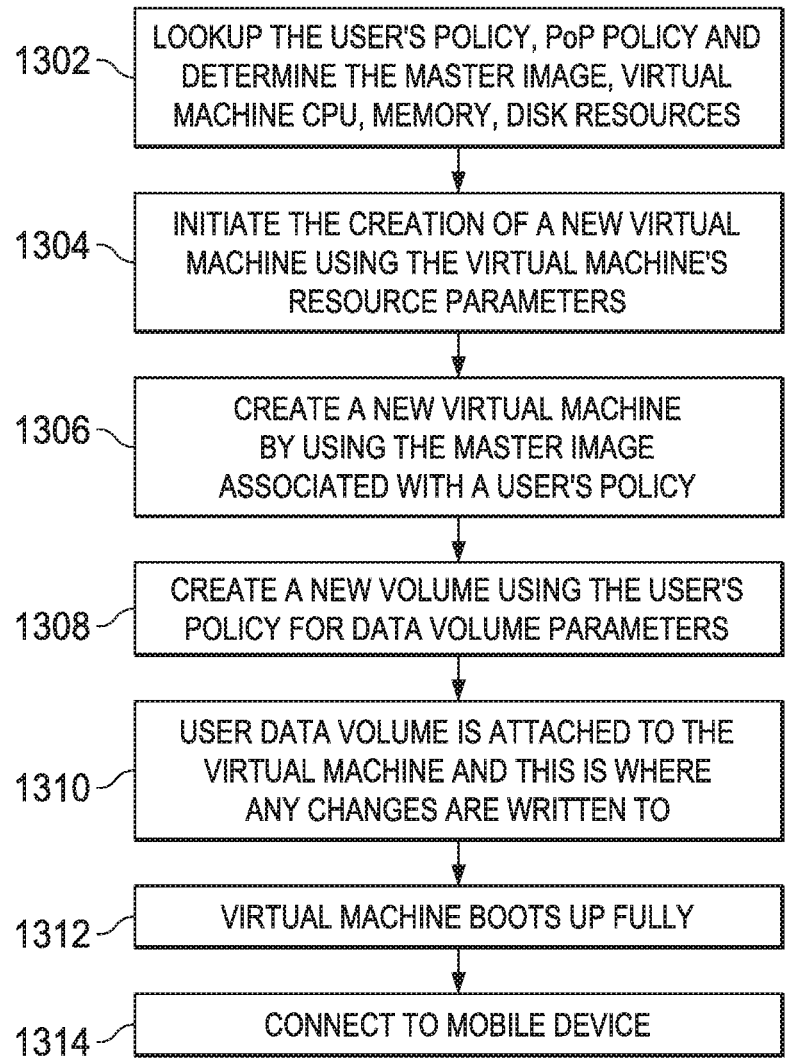
FIG. 13 depicts a flow diagram illustrating in greater detail the manner in which a virtual device may be started on a home PoP location server as shown in FIG. 10.

Referring to FIG. 13, a flow diagram illustrating in greater detail the manner in which a virtual device is started on the home PoP location (step 1006 of FIG. 10) is shown. This process is followed after steps 1210 or 1218 of FIG. 12. The process begins with the master control facility looking up the appropriate administrative policies and determining the resources that will be necessary to start the virtual device (1302). This includes identifying characteristics such as the CPU, memory and disk resources for the virtual device and identifying a corresponding master image to be used to instantiate the virtual device (1304). The master image is then used to instantiate a virtual device having the desired characteristics (1306). Because the master image is a generic device image with no user data, the virtual device must be attached to a user data volume. If a user data volume for the mobile device does not already exist, a new data volume is created for the user according to the applicable policies (1308). This data volume is attached to the virtual device (1310), and the virtual device completes its boot-up procedures (1312). If the user data volume for the user already exists, this volume is identified and attached to the virtual device without having to perform step 1308.

Figure 14:
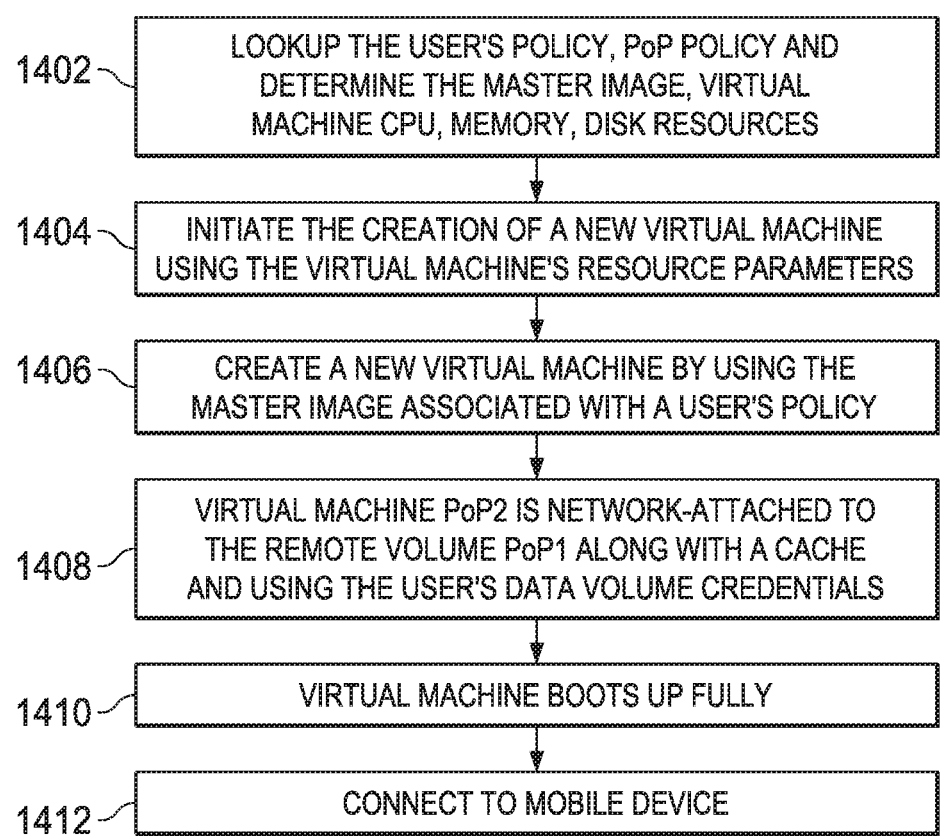
FIG. 14 depicts a flow diagram illustrating the manner in which a virtual device may be started on a PoP location other than a home PoP location server, as shown in FIG. 10.

Referring to FIG. 14, a flow diagram illustrating the manner in which a virtual device is started on a PoP location other than the home server is shown. In this case, the master control facility looks up the administrative policies and determines the resources that will be required for the virtual device (1402) in essentially the same manner as described in connection with FIG. 13. The characteristics of the virtual device are also determined (1404) in the same manner as FIG. 13. The virtual device, however, is instantiated on the selected roaming PoP location (rather than the home server) from a master image stored on the roaming server (1406). The instantiated virtual device is attached to the user data volume that is stored on the home PoP location. Because the user data volume is not stored on the roaming PoP location, data from this user volume is cached on the roaming PoP location (1408) so that it can be locally accessed by the virtual device. The virtual device then completes its boot-up procedures (1410).

Figure 15:
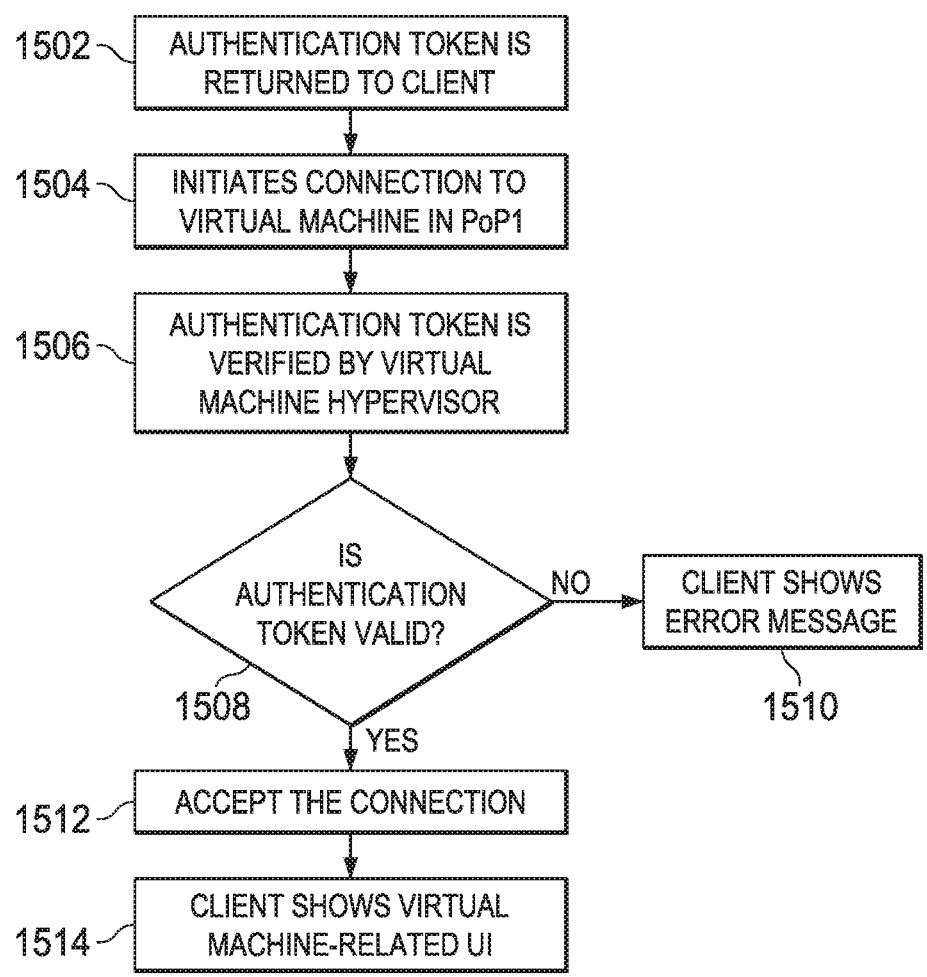
FIG. 15 depicts a flow diagram illustrating the completion of a connection between a mobile device and a virtual device as shown in FIG. 10.

Referring to FIG. 15, a flow diagram illustrating the completion of the connection between the mobile device and the virtual device (step 1008 of FIG. 10) is shown in more detail. After the virtual device has completed its boot-up procedures, the master control facility returns an authentication token created by the authentication service to the client on the mobile device (1502). This token contains network information that points to the virtual device that has been instantiated on either the home PoP location or the roaming PoP location. The client on the mobile device then transmits an authentication token directly to the respective PoP location to initiate the connection to the instantiated virtual device (1504). The PoP location verifies the authentication token (1506) and determines whether the token is valid (1508). If the token is not valid, an error message is transmitted to the client on the mobile device (1510). If the token is valid (1508), the PoP location accepts the connection (1512) and begins communicating with the client on the mobile device, which displays the appropriate user interface for the virtual device (1514).

Although the invention has been described with respect to specific embodiments thereof, these embodiments are merely illustrative, and not restrictive of the invention. Numerous variations of the described embodiments may be apparent from this disclosure to those skilled in the art of the invention. For instance, although the foregoing embodiments focus on the detection of a user's location and selection of a preferred server when the user initiates a session with the system, this process could be triggered in other embodiments by the master control facility, client application or other system components detecting changes in location, network connectivity, network performance, etc. during a session. The user could then be transitioned to a connection with a virtual device on a different preferred server in essentially the same manner as described above to optimize the user experience presented through the mobile device.

The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for enabling efficient roaming of mobile devices, the method comprising:
  receiving, over a network by a master control facility embodied on non-transitory computer memory, a communication from a mobile device that identifies at least a type of the mobile device, the mobile device associated with a user, the master control facility communicatively connected to multiple point-of-presence (PoP) servers at multiple different physical locations;
  determining, by the master control facility, a preferred PoP server of the multiple PoP servers that best serves an area where the mobile device is in;
  directing, by the master control facility, the preferred PoP server to instantiate a virtual device that matches the type of the mobile device; and
  communicating, by the master control facility, a message to the mobile device, the message indicating to the mobile device that the mobile device is to connect to the preferred PoP server of the multiple PoP servers for communicating with the virtual device instantiated by the preferred PoP server, wherein at least a portion of user data persistently stored on a home PoP server associated with the user is transmitted to a transient storage on the preferred PoP server.

2. The method according to claim 1, wherein the virtual device is instantiated by the preferred PoP server using a virtual device master image stored locally on the preferred PoP server or remotely on a distributed storage.

3. The method according to claim 2, wherein the virtual device master image comprises a specific operating system for the type of the mobile device and has a configuration similar to the mobile device.

4. The method according to claim 1, wherein the master control facility comprises a plurality of modules, the plurality of modules comprising a first module configured for determining a location of the mobile device and determining which PoP server of the multiple PoP servers is closest to the location of the mobile device or is in the area where the mobile device is in.

5. The method according to claim 4, wherein the plurality of modules comprises a second module configured for managing information relating to signal strength that has historically been provided by each PoP server of the multiple PoP servers to the master control facility.

6. The method according to claim 1, wherein if an existing virtual device corresponding to the mobile device was already executing on the preferred PoP server, the master control facility directs the preferred PoP server to terminate the existing virtual device.

7. The method according to claim 1, wherein transmission of the user data between the home PoP server associated with the user and the transient storage on the preferred PoP server is managed by network management service modules respectively operating on the home PoP server and the preferred PoP server.

8. A system for enabling efficient roaming of mobile devices, the system comprising:
  a master control facility embodied on non-transitory computer memory storing instructions translatable by at least one processor for:
  receiving, over a network, a communication from a mobile device that identifies at least a type of the mobile device, the mobile device associated with a user, the master control facility communicatively connected to multiple point-of-presence (PoP) servers at multiple different physical locations;
  determining a preferred PoP server of the multiple PoP servers that best serves an area where the mobile device is in;
  directing the preferred PoP server to instantiate a virtual device that matches the type of the mobile device; and
  communicating a message to the mobile device, the message indicating to the mobile device that the mobile device is to connect to the preferred PoP server of the multiple PoP servers for communicating with the virtual device instantiated by the preferred PoP server, wherein at least a portion of user data persistently stored on a home PoP server associated with the user is transmitted to a transient storage on the preferred PoP server.

9. The system of claim 8, wherein the virtual device is instantiated by the preferred PoP server using a virtual device master image stored locally on the preferred PoP server or remotely on a distributed storage.

10. The system of claim 9, wherein the virtual device master image comprises a specific operating system for the type of the mobile device and has a configuration similar to the mobile device.

11. The system of claim 8, wherein the master control facility comprises a plurality of modules, the plurality of modules comprising a first module configured for determining a location of the mobile device and determining which PoP server of the multiple PoP servers is closest to the location of the mobile device or is in the area where the mobile device is in.

12. The system of claim 11, wherein the plurality of modules comprises a second module configured for managing information relating to signal strength that has historically been provided by each PoP server of the multiple PoP servers to the master control facility.

13. The system of claim 8, wherein if an existing virtual device corresponding to the mobile device was already executing on the preferred PoP server, the master control facility directs the preferred PoP server to terminate the existing virtual device.

14. The system of claim 8, wherein transmission of the user data between the home PoP server associated with the user and the transient storage on the preferred PoP server is managed by network management service modules respectively operating on the home PoP server and the preferred PoP server.

15. A computer program product for enabling efficient roaming of mobile devices, the computer program product comprising at least one non-transitory computer-readable medium storing instructions translatable by at least one processor for a master control facility to perform:
  receiving, over a network, a communication from a mobile device that identifies at least a type of the mobile device, the mobile device associated with a user, the master control facility communicatively connected to multiple point-of-presence (PoP) servers at multiple different physical locations;

determining a preferred PoP server of the multiple PoP servers that best serves an area where the mobile device is in;

directing the preferred PoP server to instantiate a virtual device that matches the type of the mobile device; and communicating a message to the mobile device, the message indicating to the mobile device that the mobile device is to connect to the preferred PoP server of the multiple PoP servers for communicating with the virtual device instantiated by the preferred PoP server, wherein at least a portion of user data persistently stored on a home PoP server associated with the user is transmitted to a transient storage on the preferred PoP server.

16. The computer program product of claim 15, wherein the virtual device is instantiated by the preferred PoP server using a virtual device master image stored locally on the preferred PoP server or remotely on a distributed storage.

17. The computer program product of claim 16, wherein the virtual device master image comprises a specific operating system for the type of the mobile device and has a configuration similar to the mobile device.

18. The computer program product of claim 15, wherein the master control facility comprises a plurality of modules, the plurality of modules comprising a first module configured for determining a location of the mobile device and determining which PoP server of the multiple PoP servers is closest to the location of the mobile device or is in the area where the mobile device is in.

19. The computer program product of claim 18, wherein the plurality of modules comprises a second module configured for managing information relating to signal strength that has historically been provided by each PoP server of the multiple PoP servers to the master control facility.

20. The computer program product of claim 15, wherein if an existing virtual device corresponding to the mobile device was already executing on the preferred PoP server, the master control facility directs the preferred PoP server to terminate the existing virtual device.

* * * * *